US011590660B2

(12) United States Patent
Freeman et al.

(10) Patent No.: US 11,590,660 B2
(45) Date of Patent: Feb. 28, 2023

(54) INTERACTIVE AUTONOMOUS ROBOT CONFIGURED FOR DEPLOYMENT WITHIN A SOCIAL ENVIRONMENT

(71) Applicant: DISNEY ENTERPRISES, INC., Burbank, CA (US)

(72) Inventors: Kyle G. Freeman, Agoura, CA (US); Michael Fusco, Burbank, CA (US); Jeremy Andrew Mika, Burbank, CA (US); Michael Richard Honeck, Glendale, CA (US); Jon Hayes Snoddy, Pasadena, CA (US); Shelley Short, Burbank, CA (US); Cory Rouse, Burbank, CA (US); Raymond J. Scanlon, Burbank, CA (US); Clifford Wong, Burbank, CA (US); Lance Duane Updyke, Simi Valley, CA (US); Jeremie Papon, Los Angeles, CA (US); Daniel Pike, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 266 days.

(21) Appl. No.: 16/447,909

(22) Filed: Jun. 20, 2019

(65) Prior Publication Data
US 2020/0094417 A1 Mar. 26, 2020

Related U.S. Application Data

(60) Provisional application No. 62/737,067, filed on Sep. 26, 2018.

(51) Int. Cl.
*B25J 11/00* (2006.01)
*A63G 31/02* (2006.01)
(Continued)

(52) U.S. Cl.
CPC .......... *B25J 11/0005* (2013.01); *A63G 31/02* (2013.01); *B25J 9/163* (2013.01); *B25J 9/1664* (2013.01);
(Continued)

(58) Field of Classification Search
CPC ...... B25J 11/0005; B25J 9/163; B25J 9/1664; B25J 5/007; B25J 9/0006; B25J 11/0015;
(Continued)

(56) References Cited

U.S. PATENT DOCUMENTS 6,956,348 B2 10/2005 Landry et al.
7,861,352 B2 1/2011 Reindle
(Continued)

OTHER PUBLICATIONS

Gebhart, Kuri is a robot nanny that charms the kids and watched your place, CNET, Jul. 24, 2018, 4 pages, https://www.cnet.com/reviews/mayfield-robotics-kuri-preview.
(Continued)

*Primary Examiner* — Bhavesh V Amin
*Assistant Examiner* — Esvinder Singh
(74) *Attorney, Agent, or Firm* — Artegis Law Group, LLP

(57) ABSTRACT

An interactive autonomous robot is configured for deployment within a social environment. The disclosed robot includes a show subsystem configured to select between different in-character behaviors depending on robot status, thereby allowing the robot to appear in-character despite technical failures. The disclosed robot further includes a safety subsystem configured to intervene with in-character behavior when necessary to enforce safety protocols. The disclosed robot is also configured with a social subsystem that interprets social behaviors of humans and then initiates specific behavior sequences in response.

20 Claims, 24 Drawing Sheets

(51) Int. Cl.
   *B25J 9/16* (2006.01)
   *G05B 19/406* (2006.01)
   *G05B 19/4155* (2006.01)
   *G05D 1/00* (2006.01)
   *G05D 1/02* (2020.01)
   *G01S 17/89* (2020.01)

(52) U.S. Cl.
   CPC ........ *G05B 19/406* (2013.01); *G05B 19/4155* (2013.01); *G05D 1/0088* (2013.01); *G05D 1/0214* (2013.01); *G01S 17/89* (2013.01); *G05B 2219/50193* (2013.01); *G05B 2219/50391* (2013.01)

(58) Field of Classification Search
   CPC .... B25J 15/0009; B25J 11/004; B25J 11/001; B25J 11/003; B25J 11/0035; G05B 19/4155; G05B 19/406; G05B 2219/50391; G05B 2219/50193; G05B 23/0259; G05B 23/0291; G05B 9/02; G05B 19/0425; G05B 19/0428; G05B 19/048; G05B 23/0205; G05B 23/0251; G05B 23/0286; G05D 1/0088; G05D 1/0214; G05D 2201/0217; A63G 31/02; G01S 17/89; G01S 17/88; G06N 3/008
   See application file for complete search history.

(56) References Cited

U.S. PATENT DOCUMENTS

| | | | |
|---|---|---|---|
| 8,871,030 B2 | 10/2014 | Chen et al. | |
| 9,357,893 B2 | 6/2016 | Lee | |
| 10,123,674 B2 | 11/2018 | Gordon et al. | |
| 10,467,891 B1 | 11/2019 | Bart et al. | |
| 10,579,070 B1* | 3/2020 | Konrardy | G08B 21/18 |
| 2005/0151842 A1* | 7/2005 | Oohashi | G06K 9/00664 348/86 |
| 2005/0237188 A1 | 10/2005 | Tani | |
| 2005/0237189 A1 | 10/2005 | Tani | |
| 2005/0237388 A1 | 10/2005 | Tani | |
| 2007/0046237 A1 | 3/2007 | Lakshmanan et al. | |
| 2007/0279711 A1 | 12/2007 | King et al. | |
| 2011/0260830 A1 | 10/2011 | Weising | |
| 2013/0268096 A1* | 10/2013 | Riddle | G02B 26/06 700/9 |
| 2014/0067121 A1 | 3/2014 | Brooks et al. | |
| 2014/0158163 A1 | 6/2014 | Montgomery et al. | |
| 2015/0202771 A1 | 7/2015 | Lee | |
| 2016/0084737 A1 | 3/2016 | Moore et al. | |
| 2016/0266577 A1 | 9/2016 | Kerzner | |
| 2017/0125008 A1* | 5/2017 | Maisonnier | G06N 3/008 |
| 2017/0334065 A1 | 11/2017 | Liao | |
| 2018/0025430 A1 | 1/2018 | Perl et al. | |
| 2018/0047107 A1 | 2/2018 | Perl et al. | |
| 2018/0165504 A1 | 6/2018 | Kerzner et al. | |
| 2018/0229372 A1 | 8/2018 | Breazeal et al. | |
| 2018/0304471 A1* | 10/2018 | Tokuchi | B25J 11/0015 |
| 2019/0224853 A1* | 7/2019 | Gewecke | B25J 9/16 |
| 2019/0291277 A1* | 9/2019 | Oleynik | B25J 9/1669 |
| 2019/0315345 A1 | 10/2019 | Newman et al. | |
| 2019/0389058 A1* | 12/2019 | Hayashi | G05D 1/0044 |
| 2020/0073401 A1 | 3/2020 | Szatmary et al. | |
| 2020/0094417 A1 | 3/2020 | Freeman et al. | |
| 2020/0094418 A1 | 3/2020 | Mika et al. | |
| 2020/0097011 A1 | 3/2020 | Mika et al. | |
| 2020/0371525 A1* | 11/2020 | Mizukami | A63H 3/445 |
| 2021/0362338 A1 | 11/2021 | Rhim et al. | |

OTHER PUBLICATIONS

New Star Wars Jake Droid in Launch Bay Disneyland, Jun. 5, 2016, https://www.youtube.com/watch?v=KPmVJDgLn4c.
Disneyland: Jake the Droid Exploring Tomorrowland, Oct. 7, 2017, https://www.youtube.com/watch?v=nO6lmKOJ8tM.
NEW "Star Wars" droid J4-K3 roaming around Tomorrowland at Disneyland, Oct. 13, 2017, https://www.youtube.com/watch?v=6Xrxsg0NiAo.
Notice of Allowance received for U.S. Appl. No. 16/447,912, dated Jun. 30, 2021, 35 pages.
Notice of Allowability received for U.S. Appl. No. 16/447,912, dated Aug. 13, 2021, 57 pages.
Non Final Office Action received for U.S. Appl. No. 16/447,910, dated Apr. 1, 2022, 27 pages.
Final Office Action received for U.S. Appl. No. 16/447,910, dated Oct. 14, 2022, 22 pages.

* cited by examiner

MOTION CONTROL 212

INPUTS: MOTOR VELOCITY REQUESTS
OUTPUTS: 3 DOF HEAD/NECK MOTOR VELOCITIES, TORQUE

TOUCH SENSING 214

INPUTS: HUMAN TOUCH
OUTPUTS: SAFETY SIGNAL, ZONE FLAGS

ANIMATION 216

INPUTS: CUE NAME, GAZE TARGET (DERIVED FROM LIDAR SENSING), ANIMATION FILES
OUTPUTS: 3 DOF HEAD/NECK MOTOR VELOCITIES, BASE MOTOR VELOCITIES

LIGHTING CONTROL 218

INPUTS: CUE NAME, SEQUENCE FILES
OUTPUTS: RGB LED PIXELS

SHOW SUBSYSTEM 222

INPUTS: SAFETY SUBSYSTEM, OPERATIONS INTERFACE, SUPERVISOR, LOCALIZATION, PEOPLE SENSOR, NAVIGATION, COLLISION EVASION, CHARACTER FLOW DEFINITION
OUTPUTS: AUDIO, ANIMATION, NAVIGATION, LIGHTING

DEPTH CAMERAS 220

INPUTS: MULTIPLE RGB-D CAMERAS
OUTPUTS: NAVIGATION, SAFETY

PUPPETEER CONTROL 224

INPUTS: PUPPETEER RECEIVER
OUTPUTS: SHOW SUBSYSTEM, NAVIGATION

AUDIO 226

INPUTS: CUE NAME, AUDIO ASSET FILES
OUTPUTS: MULTICHANNEL DIGITAL AUDIO

SET PIECE I/O 236

INPUTS: 2D LIDAR SENSORS
OUTPUTS: NAVIGATION, COLLISION AVOIDANCE, SAFETY SIGNALS

SUPERVISOR 238

INPUTS: SAFETY SUBSYSTEM, OPERATIONS INTERFACE
OUTPUTS: SYSTEM STATE

BATTERY MANAGEMENT 240

INPUTS: BATTERY SYSTEM
OUTPUTS: SUPERVISOR, OPERATIONS INTERFACE, SHOW SUBSYSTEM

3D LIDAR 244

INPUTS: 3D LIDAR SENSORS
OUTPUTS: LOCALIZATION, NAVIGATION, PEOPLE DETECTION

FIG. 3

LOCALIZATION 252

INPUTS: 3D LIDAR
OUTPUTS: NAVIGATION, SHOW SUBSYSTEM, SUPERVISOR

PEOPLE SENSOR 254

INPUTS: 2D AND 3D LIDAR
OUTPUTS: NAVIGATION, SHOW SUBSYSTEM, SUPERVISOR

COLLISION EVASION 256

INPUTS: 2D AND 3D LIDAR
OUTPUTS: NAVIGATION, SHOW SUBSYSTEM, SUPERVISOR

NAVIGATION 258

INPUTS: SAFETY SUBSYSTEM, SHOW SUBSYSTEM, LOCALIZATION, COLLISION EVASION, MOTION CONTROL
OUTPUTS: MOTION CONTROL

SAFETY SUBSYSTEM 260

INPUTS: SUPERVISOR, BUMPERS, CLIFF SENSORS, MOTOR ENCODERS, MOTION CONTROL, 2D LIDAR, TOUCH SENSING, DEPTH CAMERAS, STOP BUTTONS, KEY SWITCH, COLLISION EVASION
OUTPUTS: MOTION CONTROL (BASE AND HEAD), NAVIGATION.

MOTION CONTROL 262

INPUTS: MOTOR VELOCITY REQUESTS
OUTPUTS: DIFFERENTIAL DRIVE VELOCITIES, CURRENT/TORQUE

2D LIDAR 274

INPUTS: 2D LIDAR SENSORS
OUTPUTS: NAVIGATION, COLLISION EVASION, SAFETY SUBSYSTEM

ENCODER 272

INPUTS: WHEEL OPTICS
OUTPUTS: NAVIGATION, SAFETY SUBSYSTEM, MOTION CONTROL

BUMPERS 278

INPUTS: CONTACT SENSING FROM THE LOWER PERIMETER OF THE CHARACTER
OUTPUTS: NAVIGATION, SAFETY SUBSYSTEM, MOTION CONTROL

CLIFF SENSOR 276

INPUTS: ULTRASONIC AND LASER SENSING, UNDERNEATH ROBOT
OUTPUTS: NAVIGATION, SAFETY SUBSYSTEM, MOTION CONTROL

FIG. 4

INTERACTIVE AUTONOMOUS ROBOT CONFIGURED FOR DEPLOYMENT WITHIN A SOCIAL ENVIRONMENT

CROSS-REFERENCE TO RELATED APPLICATIONS

This application claims the priority benefit of United States provisional patent application titled, "Interactive Autonomous Robot Configured for Deployment Within a Social Environment," filed on Sep. 26, 2018 and having Ser. No. 62/737,067. The subject matter of this related application is hereby incorporated herein by reference.

BACKGROUND

Field of the Various Embodiments

The various embodiments relate generally to robotics, and, more specifically, to an interactive autonomous robot configured for deployment within a social environment.

Description of the Related Art

A typical theme park provides guests with access to a variety of different types of attractions. For example, a given theme park could include rides, carnival games, scheduled performances, interactive experiences with theme park characters, water play areas, video game arcades, and so forth. Each of these different attractions generally includes thematic elements that relate in some way to one or more overarching themes associated with the park as a whole. For example, a theme park associated with a specific group of movies could include theme park characters derived from characters found in one or more of those movies.

Theme park characters can be implemented using several different approaches, including, for example, pre-programmed stationary animatronics or mobile robots controlled remotely. With any of these approaches, the fundamental goal of theme park characters is to provide guests with personalized, interactive, character-to-guest experiences. Such experiences are important from a guest satisfaction perspective because character-to-guest experiences enhance guest immersion within the overarching theme(s) of the theme park. For example, most children would be exceedingly happy to interact with a theme park character derived from a favorite animated feature.

Some attempts have been made to implement theme park characters via autonomous robots. These autonomous robots, under ideal circumstances, should be able to roam freely within the theme park and autonomously interact with guests. In addition, such robots should ideally be able to operate in a manner that faithfully represents the behavior of the characters the robots are meant to portray. However, in practice, this approach is infeasible via conventional autonomous robots due to a variety of technical reasons.

First, conventional autonomous robots oftentimes fail to operate "in character" and therefore fail to faithfully reproduce the expected behavior of the characters those robots are meant to portray. Consequently, character-to-guest experiences with these robots can be awkward and unsatisfying. This particular issue is exacerbated when a given robot has technical difficulties because technical difficulties oftentimes cause robots to abruptly drop all character behavior, which can be disconcerting to guests. Second, conventional autonomous robots are typically built for industrial purposes, not for social deployment, and therefore lack the requisite safety protocols required to ensure safe interactions with guests. For example, a typical industrial autonomous robot can weigh 300 pounds or more. If such a robot were to inadvertently collide with a guest, the guest could be seriously injured. For this reason, conventional autonomous robots are generally unsuitable for deployment within a theme park environment. Third, conventional autonomous robots are not designed to appreciate the range of different social behaviors associated with human beings and therefore may interact with theme park guests in a completely unrealistic way. For example, a conventional autonomous robot would fail to understand that a person walking next to the robot is likely hoping to engage with the robot socially. In such a situation, a conventional autonomous robot may simply initiate an obstacle avoidance protocol and navigate away from the person, thereby ruining a potential fulfilling character-to-guest experience for that person.

As a general matter, conventional autonomous robots are unsuitable for deployment within a theme park environment because such robots cannot accurately portray characters, are not designed safely enough for such environments, and cannot sufficiently understand human behavior to provide meaningful social interactions.

As the foregoing illustrates, what is needed in the art is an autonomous robot that is more effectively designed for deployment within a social environment, such as a theme park.

SUMMARY

Various embodiments include a computer-implemented method that causes a robot to enact a performance, including determining an initial set of operations associated with the performance, wherein each operation included in the initial set of operations is derived from a different behavior associated with a first character, determining a status for each subsystem included in a plurality of subsystems included in the robot, based on one or more of the statuses, modifying the initial set of operations to generate a set of available operations for enacting the performance, determining a first operation included in the set of available operations that should be executed by the robot, and causing the robot to execute the first operation.

At least one advantage of the disclosed techniques is that the robot may appear to behave in-character even when one or more robot subsystems fail. Accordingly, character-to-guest interactions need not be disrupted during partial robot failure.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3 is a more detailed illustration of various subsystems included in the body and arms of the autonomous robot of FIG. 1, according to various embodiments;

FIG. 4 is a more detailed illustration of various subsystems included in the core and base of the autonomous robot of FIG. 1, according to various embodiments;

DETAILED DESCRIPTION

In the following description, numerous specific details are set forth to provide a more thorough understanding of the various embodiments. However, it will be apparent to one skilled in the art that the inventive concepts may be practiced without one or more of these specific details.

As noted above, autonomous robot implementations of theme park characters are unsuitable for deployment within social environments such as theme parks for several reasons. First, conventional autonomous robots cannot accurately portray characters, especially during failure scenarios. Second, conventional autonomous robots lack the requisite safety systems to be deployed near crowds of people. Third, conventional autonomous robots do not understand common social behavior and therefore cannot engage with people socially without appearing awkward and unrealistic.

To address these specific issues, some embodiments include an interactive autonomous robot configured for deployment within a social environment. The disclosed robot includes a show subsystem configured to select between different in-character behaviors depending on robot status, thereby allowing the robot to appear in-character despite technical failures. The disclosed robot further includes a safety subsystem configured to intervene with in-character behavior when necessary to enforce safety protocols. The disclosed robot is also configured with a social subsystem that interprets social behaviors of humans and then initiates specific behavior sequences in response.

At least one advantage of the disclosed techniques is that the robot may appear to behave in-character even when one or more robot subsystems fail. Accordingly, character-to-guest interactions need not be disrupted during partial robot failure. Another advantage is that the robot is configured to respond to numerous safety conditions without breaking character, and yet retains the capacity to break character if absolutely necessary. Yet another advantage is that the robot can identify and respond to numerous potentially challenging social situations while remaining in character, further enhancing how well the robot can portray a given character. Because the robot disclosed herein addresses several specific technical challenges, the disclosed techniques provide multiple technological advancements over the prior art.

System Overview

Figure 1:
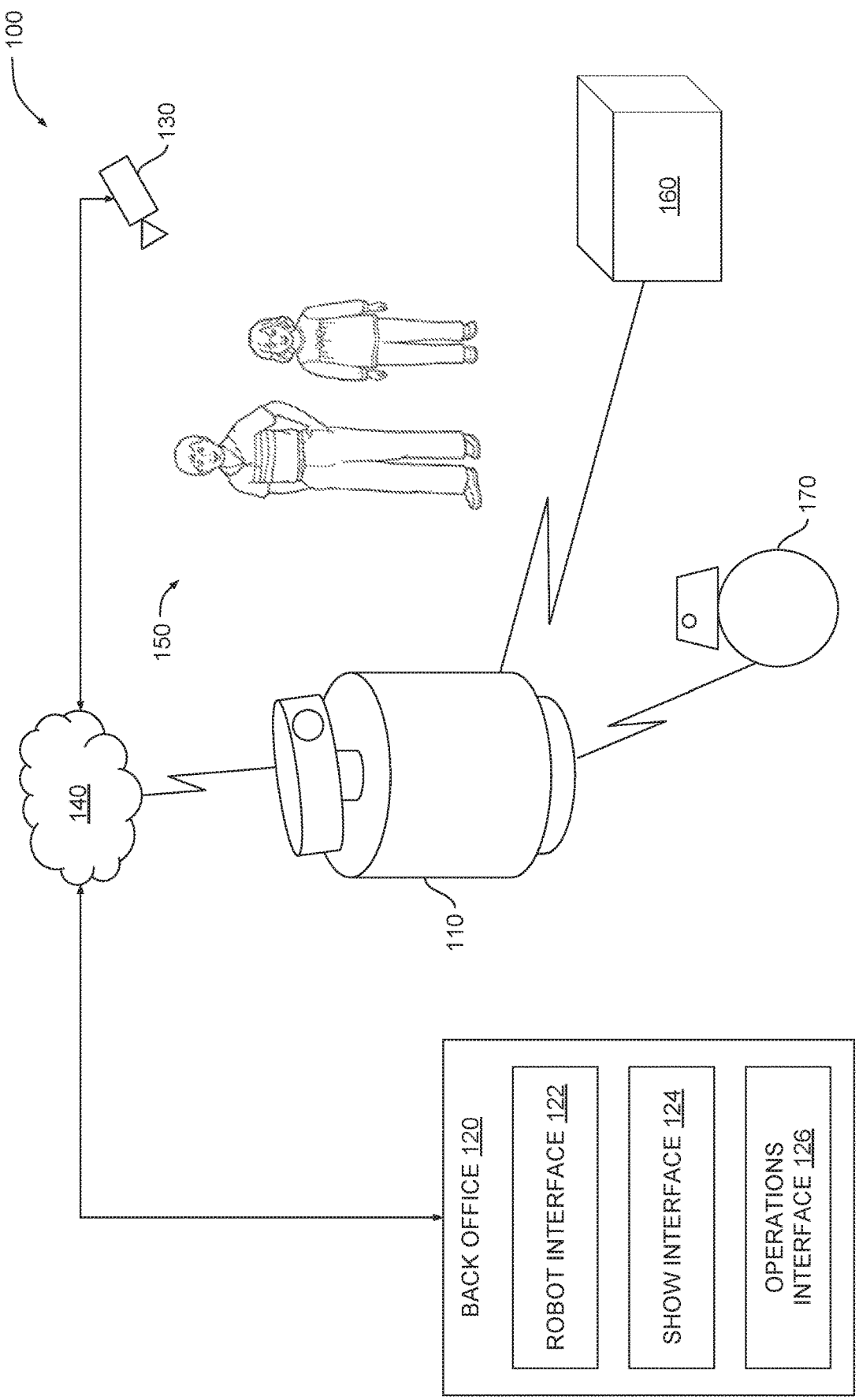
FIG. 1 illustrates a system configured to implement one or more aspects of the various embodiments.

FIG. 1 illustrates a system configured to implement one or more aspects of the various embodiments. As shown, a system 100 includes a robot 110, back office 120, and cameras 130, coupled together via network 140. System 100 is configured to be deployed within a theme park environment occupied by guests 150. Guests 150 typically include individuals and families who visit the theme park for entertainment purposes. Robot 110 is configured to interact with guests 150 in a social manner. For example, robot 110 could approach a guest 150 and output "how are you today?" to the guest. Robot 110 generally behaves according to specific characteristics in order to portray a character derived from a narrative, such as a character found in a movie or a television series. By behaving in this manner, robot 110 can facilitate character-to-guest experiences with guests 150. Robot 110 may additionally perform various routines by interacting with show elements 160 or other autonomous robots 170. For example, robot 110 could approach robot 170 and output "what is your status?" to the robot. Such routines are generally performed in the presence of guests 150 for entertainment purposes.

The operation of robot 110 is generally managed autonomously via subsystems included within robot 110 and discussed in greater detail below. In addition, back office 120 also includes several interfaces via which robot 110 can be controlled or directed. As is shown, back office 120 includes robot interface 122, show interface 124, and operations interface 126. Robot interface 122 includes control elements that permit a user to control robot 110 remotely. Show interface 124 includes control elements that allow a show director to direct various performance-oriented behaviors of robot 110. Operations interface 1226 includes control elements which permit other operational features of system 100 to be remotely controlled, including show elements 160, among others. Any of the above interfaces may monitor robot 110 via cameras 130.

When deployed within a theme park, robot 110 functions autonomously. Robot 110 may freely roam the theme park and engage in various types of interactions without being explicitly directed to do so. Robot 110 is configured to remain in character while navigating the theme park and while interacting with guests. In this disclosure, the phrase "in character" is used in reference to a specific pattern of behaviors and/or operations that can be performed by robot 110 in a manner that is generally consistent with the behavior of a pre-existing fictional or non-fictional character. Such behaviors or operations may be referred to as "in-character behaviors" or "in-character operations."

For example, suppose robot 110 is designed to portray the well-known protocol droid C-3PO from the Star Wars movies. In order to behave "in character," robot 110 could speak with a British accent and utter phrases commonly associated with C-3PO. In one embodiment, robot 110 behaves "in character" when performing a set of scripted operations associated with one or more thematic performances or "shows," and behaves "out of character" or "breaks character" when departing from scripted operations in order to, for example, implement a safety protocol.

Robot 110 includes a variety of internal systems (or subsystems) configured to perform various functions related to sensing the external environment, performing autonomous navigation and movement, performing specific actions associated with performances, interacting socially with guests 150, executing scripted interactions with show elements 160 and/or other robots 170, and other robot operations. The various subsystems and associated functions are described in greater detail below in conjunction with FIG. 2.

Figure 2:
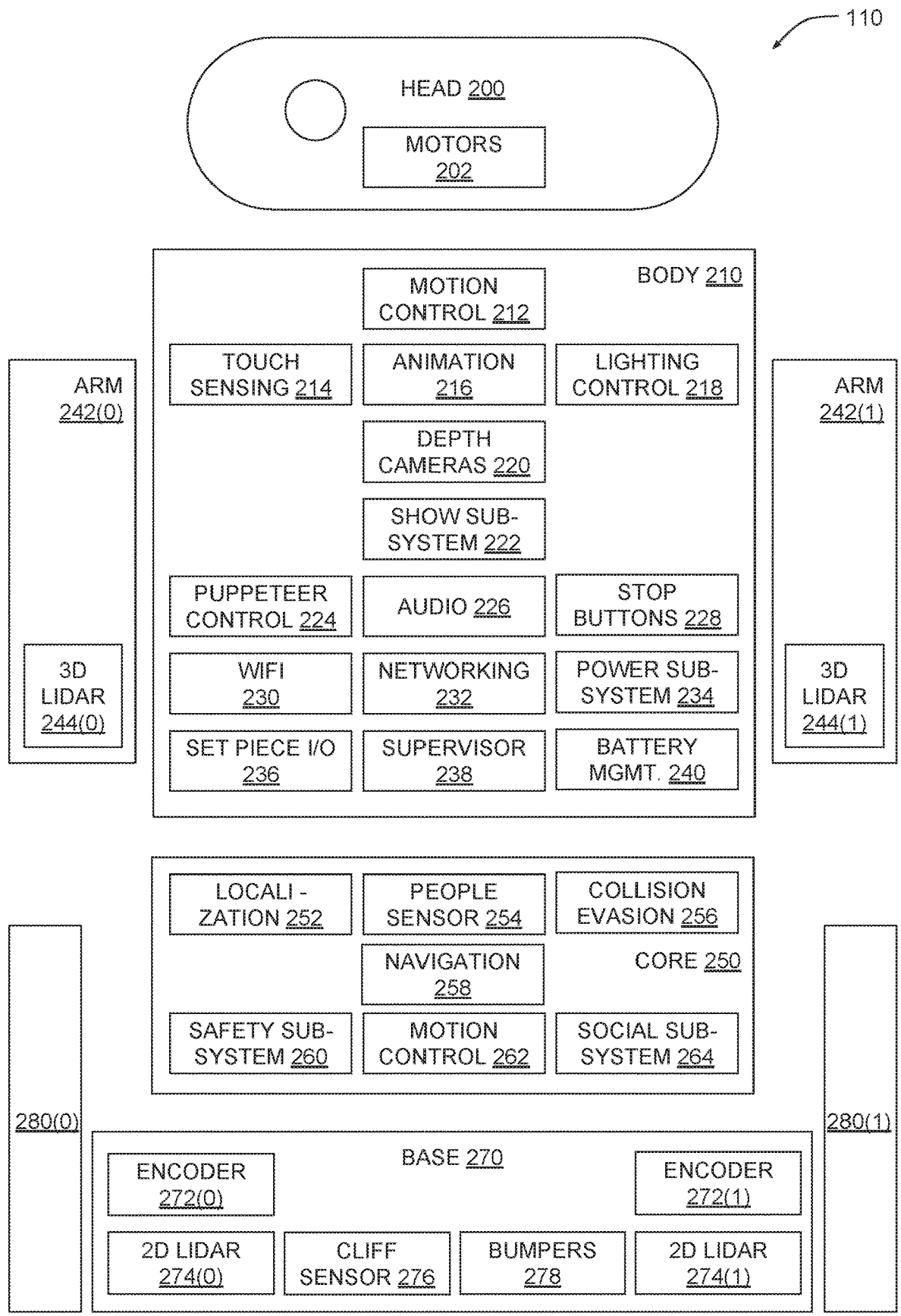
FIG. 2 is a more detailed illustration of the autonomous robot of FIG. 1, according to various embodiments.

FIG. 2 is a more detailed illustration of the autonomous robot of FIG. 1, according to various embodiments. As shown, robot 110 includes head 200, body 210, core 250, base 270, and wheels 280. Head 200 includes motors 202 that are configured to direct the position and orientation of head 200.

Body 210 includes motion control 212, touch sensing 214, animation 216, lighting control 218, depth cameras 220, show subsystem 222, puppeteer control 224, playback 226, stop buttons 228, Wi-Fi 230, networking 232, power subsystem 234, set piece input/output (I/O) 236, supervisor 238, and battery management 240. Body 210 is coupled to arms 242, each of which includes a three-dimensional (3D) LIDAR 244. Some of the above-described subsystems are also described in greater detail below in conjunction with FIG. 3.

Core 250 includes localization 252, people sensor 254, collision evasion 256, navigation 258, safety subsystem 260, motion control 262, and social subsystem 264. Base 270 includes encoders 272, two-dimensional (2D) LIDAR 274, cliff sensor 276, and bumpers 278. Each of these different subsystems is configured to be coupled to any of the other subsystems within robot 110. In one embodiment, robot 110 includes one or more communication buses to which the various subsystems described above can be coupled for communication purposes. Some of the above-described subsystems are also described in greater detail below in conjunction with FIG. 4.

In operation, the various subsystems within robot 110 interoperate in order to perform specific in-character behaviors as well as particular behaviors that break character, including behaviors intended to mitigate system/subsystem failures and safety behaviors designed to prevent collisions and other accidents. Under nominal operating conditions, robot 110 operates according to a set of scripts which include certain behavior sequences robot 110 should follow when conditions permit. For example, a given behavior sequence could indicate that robot 110 should navigate towards a specific destination and then, upon arrival, output a portion of scripted dialogue. A given behavior sequence may be coordinated by specific cues which cause robot 110 to perform a sequence of operations. For example, a "nod" cue could cause robot to actuate head 200 in order to perform a nodding motion. Show subsystem 222 generates these cues and is generally responsible for coordinating in-character robot behavior. Conversely, safety subsystem 260 is responsible for intervening with in-character behavior, as needed, in order to enforce safety protocols. These particular subsystems and some of the others shown in FIG. 3 are described in greater detail below.

FIG. 3 is a more detailed illustration of various subsystems included in the body and arms of the autonomous robot of FIG. 1, according to various embodiments. The various subsystems shown are provided with details regarding specific inputs and outputs needed for nominal operation. As shown, motion control 212 receives motor velocity requests and then outputs 3 degree of freedom (DOF) head and neck motor velocities and corresponding torques. Touch sensing 214 receive capacitive touch events, potentially input by a guest 150, and then outputs a safety signal and one or more flags indicating a zone where the touch event occurred.

Animation 216 receives a cue name, a gaze target, and one or more animation files. The cue name corresponds to a behavior sequence, as described above. The gaze target indicates a set of real-world coordinates for directing head 200 during animation. The animation files describe how other portions of robot 110 should move during animation. Animation 216 outputs 3 degree of freedom (DOF) head/neck motor velocities and torques, along with base motor velocities for moving robot 110 as a whole. Lighting control 218 operates in conjunction with animation 216 and in response to received cues. Lighting control 218 also receives sequence files indicating a lightning sequence, and then outputs signals for illuminating red-green-blue (RGB) light-emitting diodes (LEDs). Depth cameras 220 include multiple RBG depth cameras that capture optical signals and then output data to navigation 258 and safety subsystem 260.

Show subsystem 222 receives inputs from safety subsystem 260, operations interface 126, supervisor 238, localization 252, people sensor 254, navigation 258, and collision evasion 256. As mentioned, show subsystem 222 generally coordinates in-character behavior. Show subsystem 222 also receives a character flow definition. A character flow definition can include one or more behavior cue definitions, where a given behavior cue definition is a set of computer-perceivable inputs. Such inputs could include, for example, gestures, poses, eye contact, and physical contact, among others. A set of behavior cues generally define an unambiguous behavioral state, such as, for example, engaging in conversation, holding hands, showing interest, listening closely, taking a photograph, and so forth. A given character flow definition includes a sequence of such behavior cues. Show subsystem 222 outputs control signals to audio 226, animation 216, navigation 258, and lighting control 218 in order to execute various behaviors. Puppeteer control 224 receives inputs from robot interface 122 via a radio receiver and then outputs control signals to show subsystem 222 and navigation 258. Puppeteer control 224 allows a remote user to control robot 110. Audio 226 operates in conjunction with animation 216 and lighting control 218 to implement various robot behaviors. Audio 226 receives a cue and audio asset files, and then outputs audio based on the asset files and in response to the cue.

Set piece I/O 236 is configured to coordinate interactions between robot 110 and show elements or "set pieces" distributed within the theme park, as also described below in conjunction with FIGS. 5-6. Supervisor 238 receives inputs from safety subsystem 260 and operations interface 126 and modifies the overarching system state of robot 110 as needed. Battery management 240 receives inputs from internal batteries and then outputs data regarding charge levels, battery status and so forth to supervisor 238, operations interface 126, and show subsystem 222. 3D LIDAR 244 is a laser-based depth sensor configured to generate a 3D spatial map of the environment surrounding robot 110 and to then output this data to localization 252, navigation 258, and people sensor 254.

FIG. 4 is a more detailed illustration of various subsystems included in the core and base of the autonomous robot of FIG. 1, according to various embodiments. As with FIG. 3, the various subsystems shown here are provided with details regarding specific inputs and outputs needed for nominal operation. As shown, localization 252 receives inputs from 3D LIDAR 244 and 2D LIDAR 274 and then outputs localization data indicating the position of robot 110 to navigation 258, show subsystem 222, and supervisor 238. People sensor 254 receives similar inputs as localization 252 and processes those inputs to detect the presence of guests 150. People sensor 254 outputs data describing detected guests to navigation 258, show subsystem 222, and supervisor 238. Collision evasion 256 processes data from 3D LIDAR 244 and 3D LIDAR 274 to identify approaching objects, and outputs related data to navigation 258, show subsystem 222, and supervisor 238. Navigation 258 generally coordinates the navigation of robot 110 within the theme park. Navigation 258 receives inputs from safety subsystem 260, show subsystem 222, localization 252, collision evasion 256, and motion control 212, and then outputs control signals to motion control 262 within base in order to effect movement of robot 110.

Safety subsystem 260 is configured to interoperate with show subsystem 222 in order to maintain the safety of guests 150. Safety subsystem 260 may intervene with show subsystem 222 and cause robot 110 to break character, when necessary, to implement safety protocols. Safety subsystem 260 may receive inputs from any of the subsystems included in robot 110 in order to determine whether safety protocols should be implemented. For example, safety subsystem 260 could receive inputs from people sensor 254 indicating the presence of guests 150, and then implement appropriate safety protocols in response. Safety subsystem 260 issues control signals to motion control 212 and 262 and navigation 258.

Encoder 272 monitors the rotation of wheels 280 and outputs encoded wheel rotation data to navigation 258, safety subsystem 260, and motion control 262. 2D LIDAR 274 is a laser-based range finding device that outputs depth information to navigation 258, collision evasion 256, and safety subsystem 260. Cliff sensor 276 is configured to detect steep drop-offs which could topple robot 110. Cliff sensor 276 implements ultrasonic and laser sensing and outputs cliff data to navigation 258, safety subsystem 260, and motion control 262. Bumpers 278 are contact sensing instruments which detect minor collisions with objects near the lower portion of robot 110. Bumpers 278 output contact data to navigation 258, safety subsystem 260, and motion control 262.

Referring generally to FIGS. 1-4, the particular implementation of robot 110 discussed above is exemplary and not meant to limit the scope of possible ways robot 110 could be implemented. Any of the subsystems discussed thus far may be implemented via dedicated hardware, one or more software modules executing on a computer system, or a combination of the two. Via the above subsystems, robot 110 is configured to perform pre-programmed interactions with show elements 160 stationed within the theme park, as described in greater detail below in conjunction with FIGS. 5-6. Robot 110 is also configured to modify in-character behavior based on available subsystems, as described in greater detail below in conjunction with FIGS. 7-11. Robot 110 is further configured to implement safety protocols while selectively maintaining in-character behavior, as described in greater detail below in conjunction with FIGS. 12-15. Finally, robot 110 is configured to interpret social cues from guests in order to facilitate character-to-guest interactions, as described in greater detail below in conjunction with FIGS. 16-19.

Programmable Robot Interactions

Figure 5:
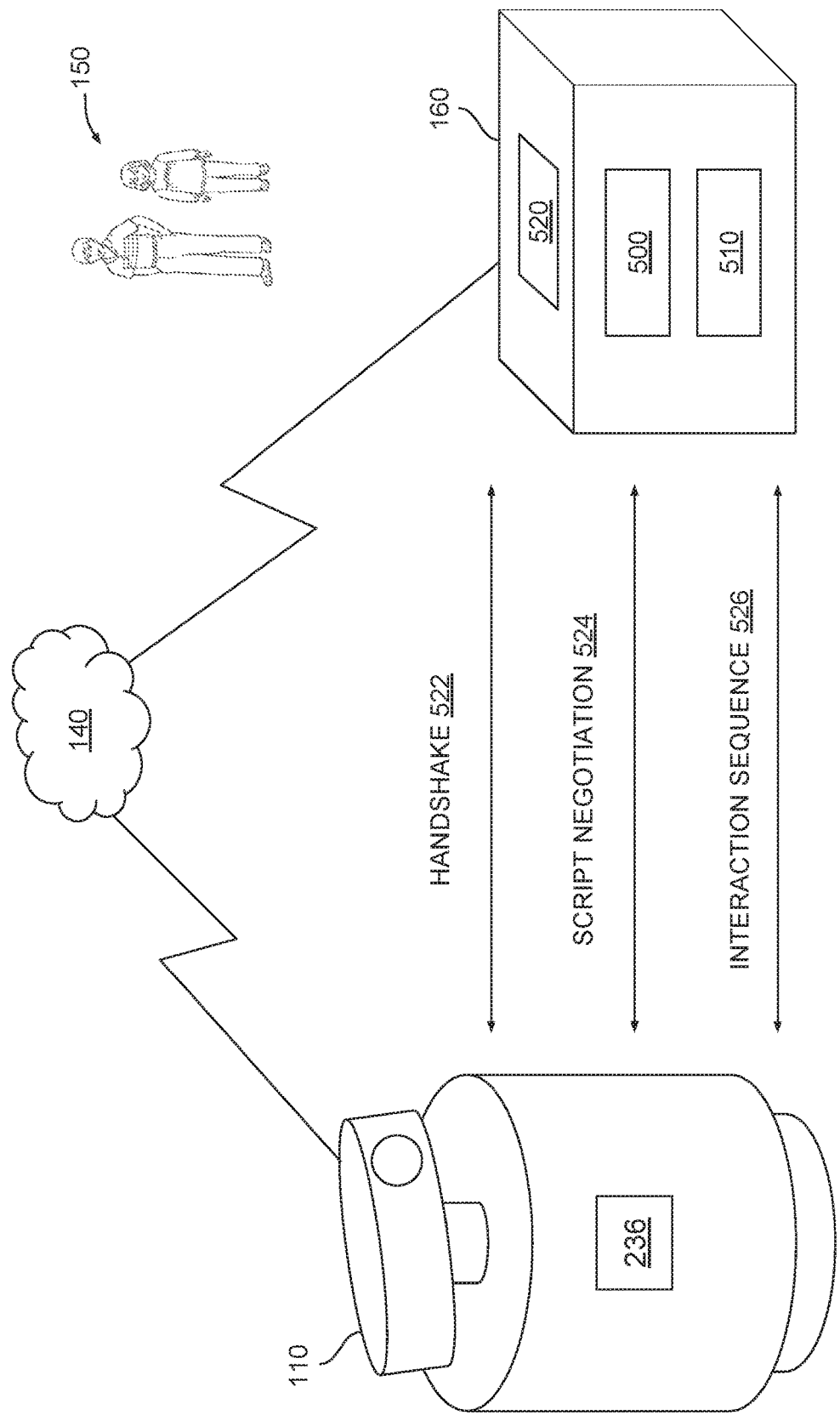
FIG. 5 illustrates how the autonomous robot of FIG. 1 performs an interaction with a show element, according to various embodiments.

FIG. 5 illustrates how the autonomous robot of FIG. 1 performs an interaction with a show element, according to various embodiments. As shown, robot 110 is configured to interact with show element 160, which includes a computing device 500, a sensor 510, and an emitter 520. Robot 110 and show element 160 are indirectly coupled together via network 140 and also configured to directly communicate with one another in order to cooperatively execute a coordinated performance or "show" for the benefit of guests 150.

In operation, robot 110 freely roams the theme park in the manner described and, in so doing, may encounter show element 160. When robot 110 is proximate to show element 160, sensor 510 detects various signals generated by robot 110 and computing device 500 then initiates a handshake 522 with robot 110 by transmitting a handshake signal to robot 110 via emitter 520. The handshake signal could be a light signal, ultrasonic signal, or a radio signal, for example. Set piece I/O 236 receives the handshake signal and then replies with an acknowledgement (ack) signal, Sensor 510 receives the ack signal and computing device 500 then establishes direct communications with robot 110.

Robot 110 and computing device 500 then perform a script negotiation 524 exchange in order to mutually agree to perform a specific set of operations delineated by a particular script. In one embodiment, robot 110 and show element 160 select a particular script based on mutually available resources, subsystem statuses, environmental parameters, other pre-existing objectives, and so forth. Once a script is agreed upon, robot 110 and show element 160 execute an interaction sequence 526.

In one embodiment, to participate in a given interaction sequence, robot 110 first sets a base target and a gaze target. The base target is a set of coordinates to which robot 110 should navigate during the interaction sequence. The gaze target is a set of coordinates where robot 110 should appear to be looking during the interaction sequence. Robot 110 then determines the particular available interaction methods for the interaction sequence. Those methods could involve the activation of lighting systems, audio output systems, or other mechanisms. Robot 110 also determines the priority of the interaction sequence in order to ensure that other higher-priority operations are not neglected. In some cases, robot 114 may determine that a pre-existing objective takes priority over interacting with show element 160, and then terminates interactions with show element 160.

In an exemplary interaction, suppose robot 110 travels through the theme park towards a distant objective where a performance is planned to take place. Robot 110 ventures close to show element 160, which, in this example, is a steam vent. Show element detects robot 110 and initiates handshake 522. Robot 110 and show element 160 then perform script negotiation 524. Show element 160 determines that sufficient steam resources are held in reserve to permit the performance of a "steam blast" routine. Robot 110 determines that the performance associated with the original objective does not begin for another 15 minutes, and so sufficient time is available for the steam blast routine. Robot 110 and show element 160 reach a consensus to perform the steam blast routine and then initiate interaction sequence 526. Robot 110 approaches a base target nearby show element 160 and then directs head 200 towards a steam portal on show element 160. Show element 160 opens the steam portal and blasts robot 110 with steam. Nearby guests 150 witness this interaction and (ideally) are amused with how the apparent curiosity of robot 110 backfires. When the steam blast routine is complete, robot 110 continues traveling to the distant objective.

The above approach may be applied to any technically feasible show element having any set of mechanisms, lighting systems, robotic elements, display systems, and so forth. Further, this approach can be implemented between robot 110 and other robots 170. Any sort of interaction sequence may occur, as well. FIG. 6 sets forth a general procedure for performing interaction sequences such as those described above.

Figure 6:
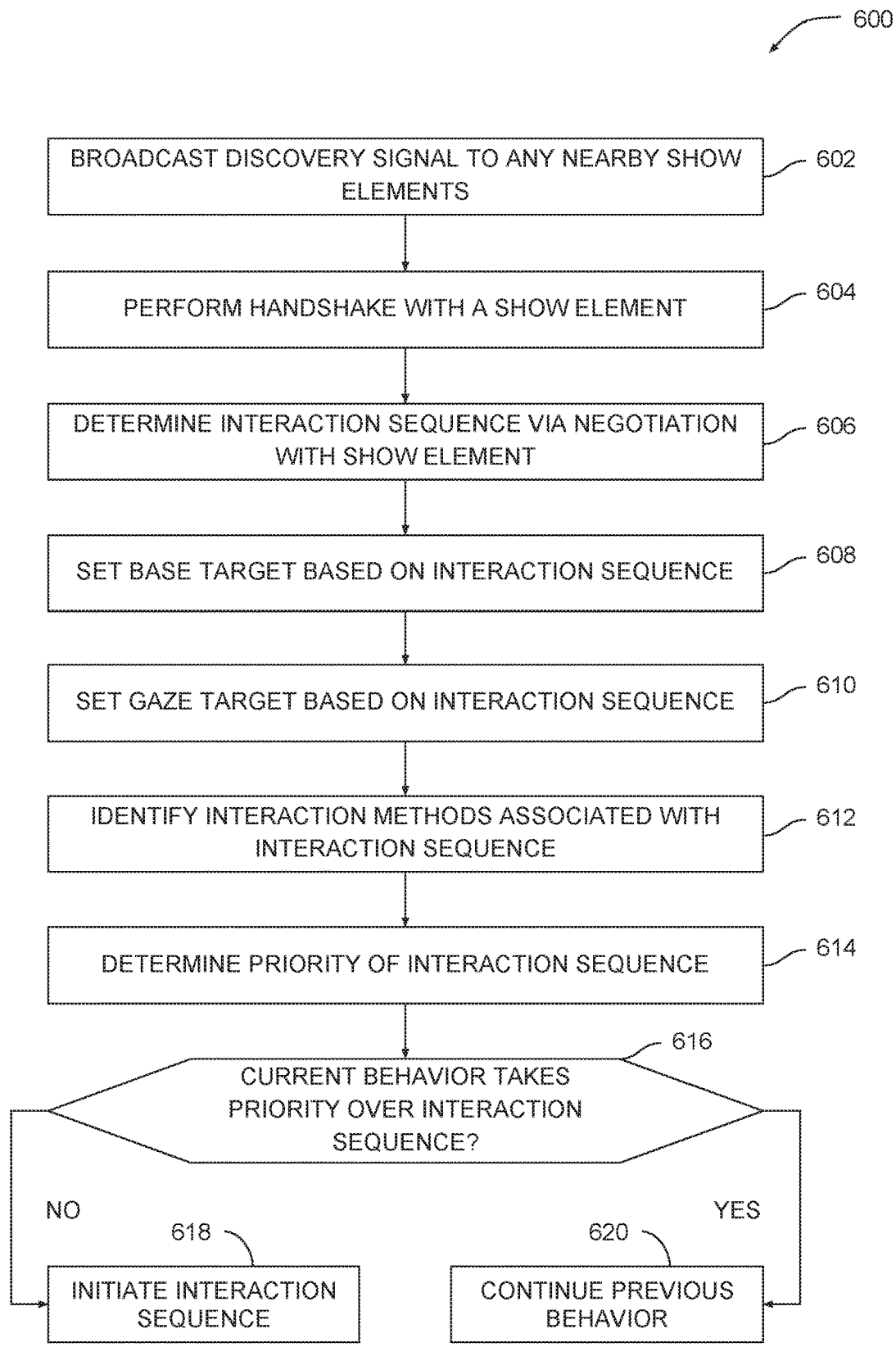
FIG. 6 is a flow diagram of method steps for causing a robot to perform an interaction with a show element, according to various embodiments.

FIG. 6 is a flow diagram of method steps for causing a robot to perform an interaction with a show element, according to various embodiments. Although the method steps are described in conjunction with the systems of FIGS. 1-5, persons skilled in the art will understand that any system may be configured to perform the method steps in any order.

As shown, a method 600 begins at step 602, where robot 110 broadcasts a discovery signal to any nearby show elements. The discovery signal could be, for example, an ultrasonic signal, a radio signal, an optical signal, and so forth. In one embodiment, any LIDAR signal broadcast by robot 110 for navigation purposes may serve the additional purpose of a discovery signal. At step 604, robot 110 and show element 160 perform a handshake with one another. The handshake generally involves an exchange of transmissions meant to establish direct communications. At step 606, robot 110 determines an interaction sequence to perform with show element 160 by engaging in a script negotiation process.

At step 608, robot 110 sets a base target based on the interaction sequence determined at step 606. The base target is a set of coordinates where robot 110 should reside when the interaction sequence begins. The base target is generally defined relative to show element 160. At step 610, robot 110 sets a gaze target where robot 110 should appear to be looking when the interaction sequence begins. Robot 110 may include one or more non-functional "eyes" that can be pointed in different directions to cause robot 110 to appear to be looking in specific directions. At step 612, robot 110 identifies one or more interaction methods associated with the interaction sequence. Those methods may involve any robot system or subsystem.

At step 614, robot 110 determines the priority of the interaction sequence. Robot 110 may be engaged with multiple objectives having competing priorities and generally evaluates these priorities dynamically. At step 616, robot 110 determines whether a current behavior takes priority over the interaction sequence. For example, robot 110 may already be engaged with a high-priority objective that supersedes all other behaviors, such as returning to a charging station before battery power is fully depleted. Alternatively, robot 110 could only be engaged with low priority objectives that can be overridden under certain circumstances. If the current behavior is not prioritized above the interaction sequence, then the method 600 proceeds to step 618 and robot 110 initiates the interaction sequence with show element 160. Otherwise, the method proceeds to step 620 and robot 110 continues performing the higher-priority previous behavior. In one embodiment, the above prioritization step occurs before script negotiation.

Robot 110 implements the above-described approach when performing scripted interactions with set pieces (such as show elements 160 and other robots 170). Robot 110 may also perform loosely scripted interactions with guests 150. In either case, robot 110 generally operates in character by displaying specific behavioral characteristics associated with a given character. However, under certain circumstances one or more subsystems within robot 110 may partially or completely fail, thereby interfering with the ability of robot 110 to perform specific interactions in character and/or perform specific interactions at all. To mitigate the degree to which robot 110 breaks character during subsystem failures, show subsystem 222 is configured to modify the behavior of robot 110 in response to specific subsystem failures using a technique described in greater detail below in conjunction with FIGS. 7-11.

Graceful Degradation of In-Character Behavior

As shown in each of FIGS. 7-10, character logic 700 includes various exemplary behaviors that can be performed by robot 110 during a given performance. Character logic 700 generally resides within show subsystem 222 of FIG. 2. During normal robot operation and also during performances (such as scripted interactions), show subsystem 222 is configured to selectively suppress different character behaviors depending on the availability of particular subsystems. The dependencies between robot subsystems, character behaviors, and show outputs are discussed below in conjunction with FIG. 7.

Figure 7:
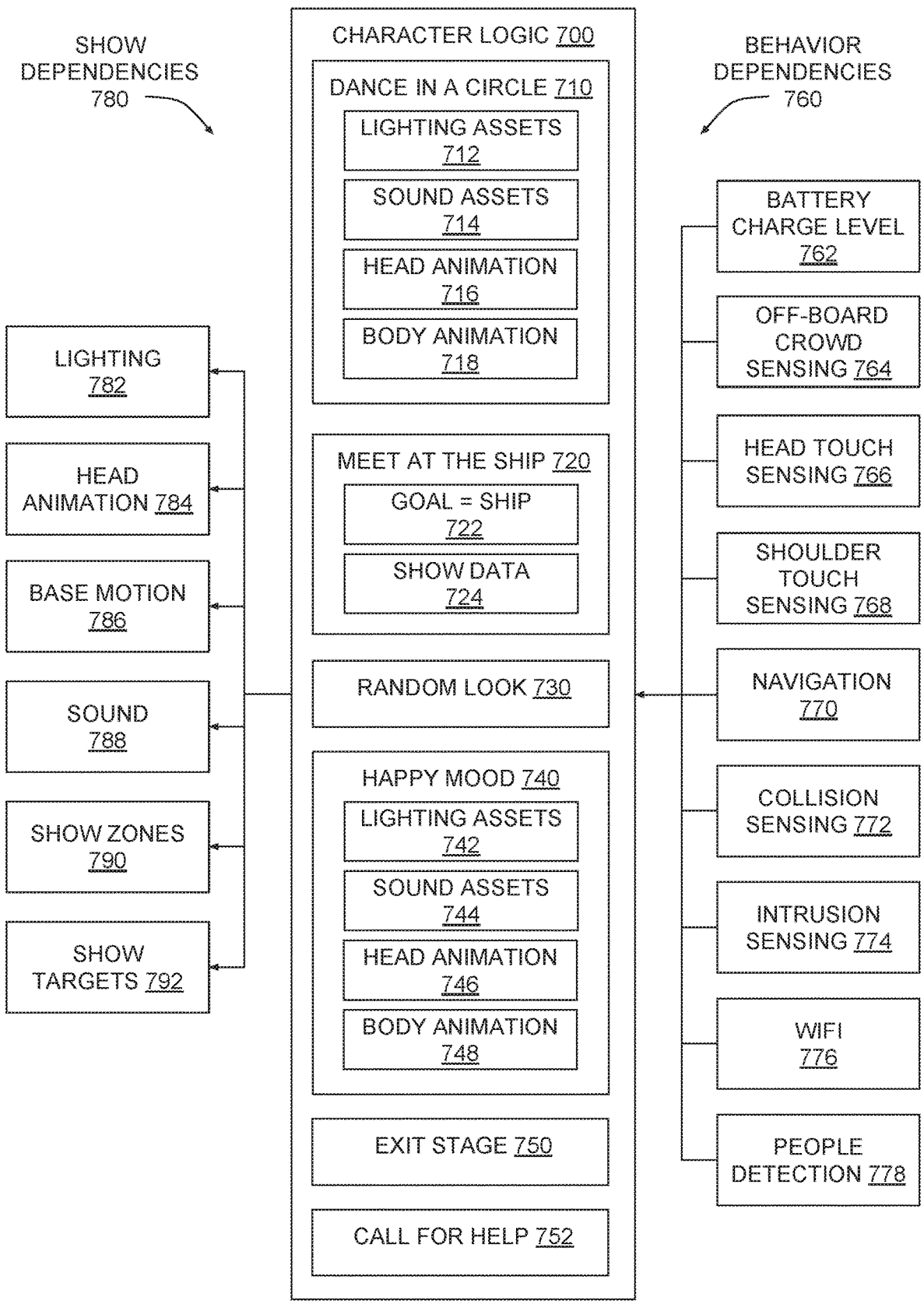
FIG. 7 illustrates how various robot behaviors depend on robot system status, according to various embodiments.

FIG. 7 illustrates how various robot behaviors depend on robot system status, according to various embodiments. As shown, character logic 700 includes a set of behavior sequences, including dance in a circle 710, meet at the ship 720, random look 730, happy mood 740, exit stage 750 and call for help 752. Show subsystem 222 executes these different behaviors during performances, during character-to-guest interactions, during interactions with set pieces, and at other times, as well. Each behavior sequence shown specifies particular subsystems, submodules, and/or data involved with performing the corresponding behavior.

As is shown, dance in a circle 710 involves the coordination of specific lighting assets 712, sound assets 714, head animation 716, and body animation 718. Meet at the ship 720 involves data reflecting that the ship is a destination as well as show data 724 needed to execute a performance routine that involves the ship. Random look 730 is not shown with any needed elements, but generally involves the coordination of motors 202 within head 200 of robot 110. Happy mood 740 is a behavior sequence used to display happiness, and involves lighting assets 742, sound assets 744, head animation 746, and body animation 748. These particular lighting and sound assets and animation modules may be the same as those shown within dance in a circle 710, although typically a different configuration of submodules is needed to implement different behaviors. For example, the specific lighting assets needed for dance in a circle 710 would be different than those needed for happy mood 740. Exit stage 750 and call for help 752 are failsafe behaviors that can be implemented in character or out of character.

Each behavior sequence depends to some degree on the status of one or more underlying robot subsystems. Accordingly, behavior dependencies 760 represent a mapping between various status indicators and corresponding behavior sequences within character logic 700. The status indicators shown include battery charge level 762, off-board crowd sensing 764, head touch sensing 766, shoulder touch sensing 768, navigation 770, collision sensing 772, intrusion sensing 774, WiFi 776, and people detection 778. Each status indicator may indicate the availability of a specific subsystem, including those shown in FIGS. 2-4. For example, battery charge level 762 could be coupled to battery management 240 and configured to report a battery charge level measured by battery management 240. Similarly, collision sensing 772 could be coupled to people sensor 254 and/or collision evasion 256 and configured to indicate the degree to which collision sensing is available. Any of the status indicators discussed may output a binary signal indicating that a corresponding subsystem or subsystems is available or unavailable, or output an analog signal indicating a percentage of availability.

As also shown, show dependencies 780 represent a mapping between specific behavior sequences and associated show outputs. A "show output" generally includes any output robot 110 produces when performing, including lighting, motion, sound, direction of travel, and so forth. Lighting 782, head animation 784, base motion 786, sound 788, show zones, 790, and show targets 792 are all exemplary show outputs.

In operation, shown subsystem 222 coordinates the nominal operation of robot 110 in performing scripted, semi-scripted, and unscripted behaviors. As mentioned, these behaviors may include scheduled performances as well as unscheduled, spontaneous interactions such as that described above in conjunction with FIG. 5. During any such operation, show subsystem 222 dynamically monitors the status of numerous underlying subsystems within robot 110. Then, based on behavior dependencies 760, show subsystem 222 partially or completely suppresses behaviors that depend on failing or failed subsystems. By extension, certain show outputs also become unavailable in response to suppressed behaviors and unavailable subsystems.

Because show subsystem 222 selectively suppresses certain behaviors while maintaining the availability of others, robot 110 may perform a variety of in-character behaviors even when numerous subsystems fail. Conceptually, show subsystem 222 implements a "graceful" degradation of in-character behavior, as opposed to simply shutting down in response to a subsystem failure, as found with prior art approaches. One advantage of this approach is that robot 110 can provide a more realistic portrayal of a given character compared to conventional robots, which may abruptly break character in failure scenarios. Because show subsystem 222 causes robot 110 to gradually transition out of character, and only on an as-needed basis, guests 150 may not actually notice if robot 110 experiences technical difficulties. Several exemplary failure scenarios are described below in conjunction with FIGS. 8-10.

Figure 8:
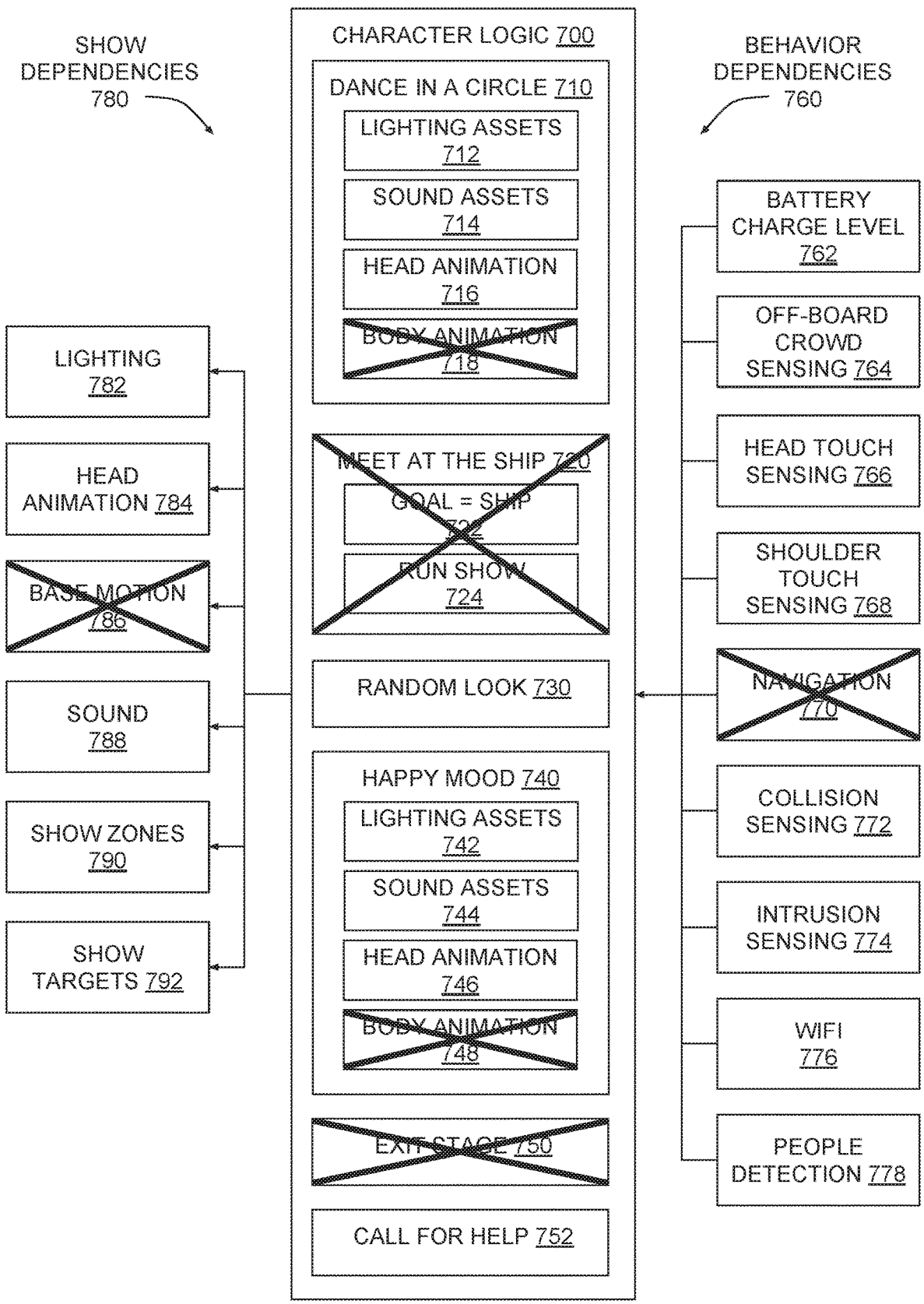
FIG. 8 illustrates an example of how the autonomous robot of FIG. 1 maintains in-character behavior during a subsystem failure, according to various embodiments.

FIG. 8 illustrates an example of how the autonomous robot of FIG. 1 maintains in-character behavior during a subsystem failure, according to various embodiments. In the exemplary scenario shown, navigation 770 indicates that all localization and navigation functionalities are currently offline, meaning that robot 110 is unable to navigate from one place to another. Based on behavior dependencies 760, show subsystem 222 determines that certain behaviors which depend on localization and navigation functionalities should be suppressed. Show subsystem 222 then suppresses meet at the ship 720 as a whole because robot 110 cannot relocate to the ship. Show subsystem 222 also suppresses body animation 718 associated with dance in a circle 710, and body animation 748 associated with happy mood 740. However, because dance in a circle 710 and happy mood 740 do not require localization and navigation, these behaviors are modified in a creatively acceptable way and remain available in a slightly degraded form. With this approach, robot 110 remains in character and may perform any of the remaining behaviors in character, despite experiencing a major subsystem failure.

Figure 9:
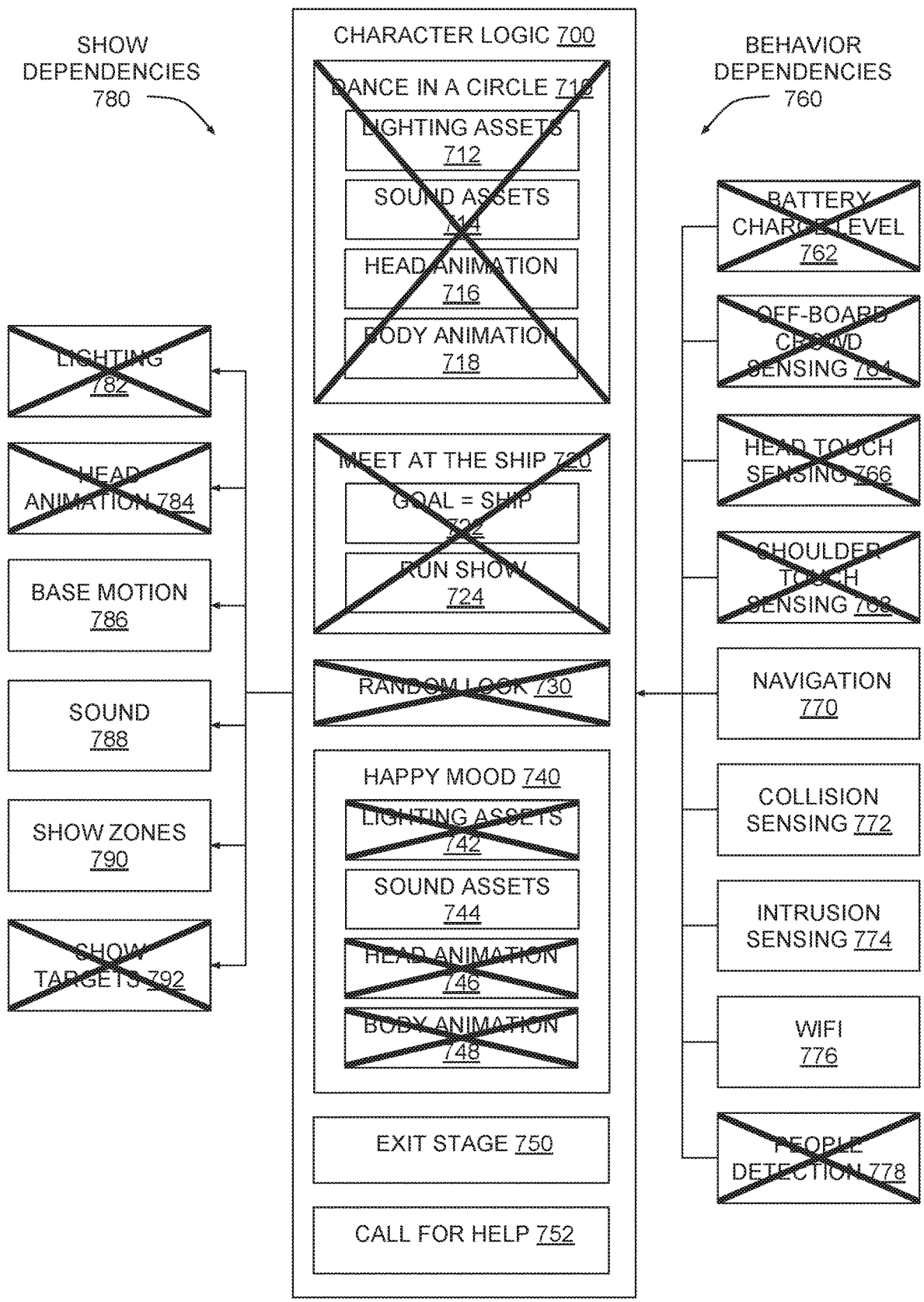
FIG. 9 illustrates an example of how the autonomous robot of FIG. 1 maintains in-character behavior during multiple subsystem failures, according to various embodiments.

FIG. 9 illustrates an example of how the autonomous robot of FIG. 1 maintains in-character behavior during multiple subsystem failures, according to various embodiments. In the exemplary scenario shown, numerous subsystems have failed, including batteries, various sensors, and people detection. Consequently, show subsystem 222 suppresses many behavior sequences entirely, including dance in a circle 710, meet at the ship 720, and random look 730. Although much of happy mood 740 is suppressed, sound assets 744 remain available. Exit stage 750 and call for help 752 are also available. Given that so many behaviors are unavailable, robot 110 executes exit stage 750 while also emitting happy sounds via execution of sound assets 744. Robot 110 may also execute call for help 752. Accordingly, robot 110 manages multiple subsystem failures without drastically breaking character.

Figure 10:
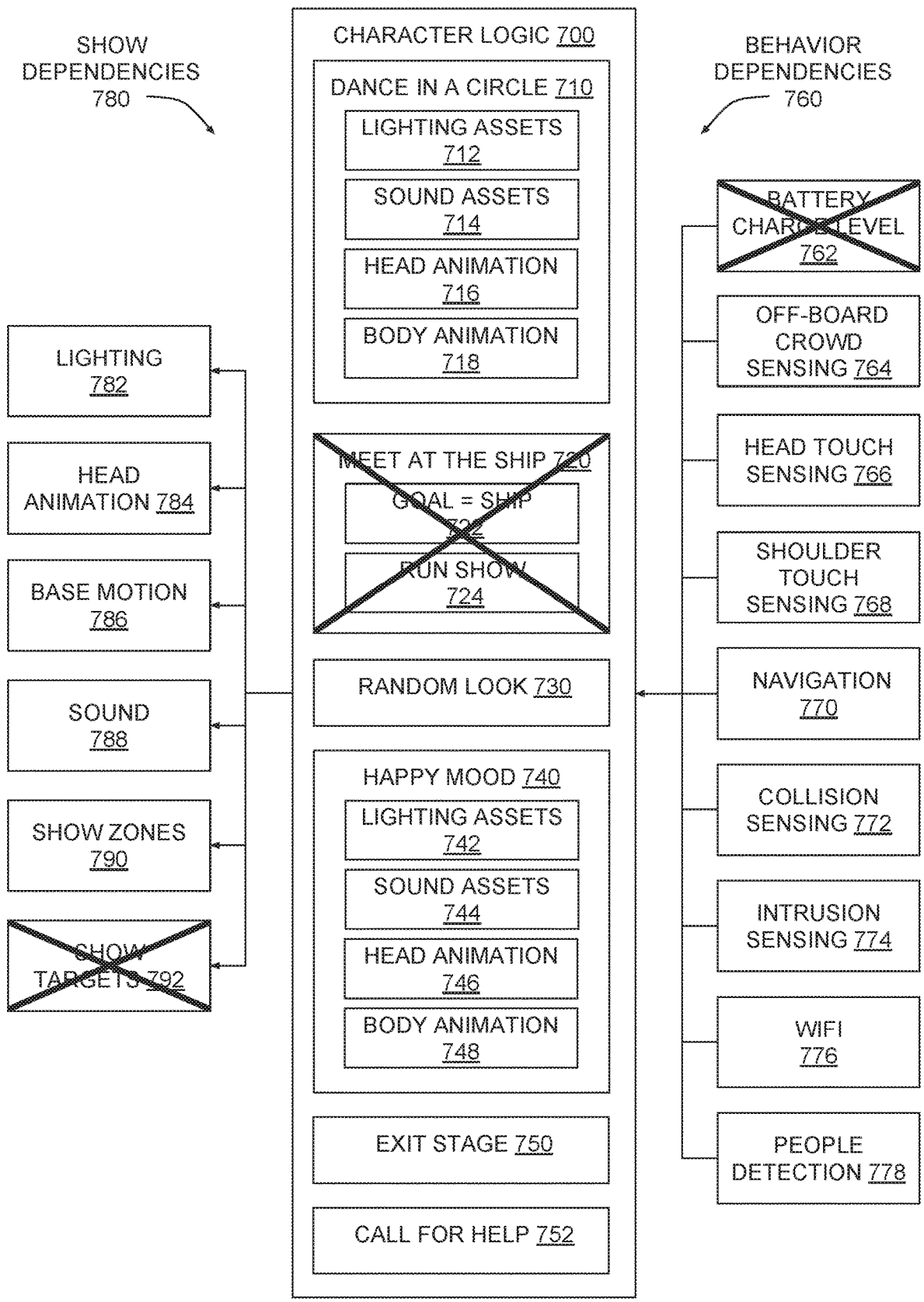
FIG. 10 illustrates an example of how the autonomous robot of FIG. 1 reduces in-character behavior during a subsystem failure, according to various embodiments.

FIG. 10 illustrates an example of how the autonomous robot of FIG. 1 reduces in-character behavior during a subsystem failure, according to various embodiments. In the exemplary scenario shown, battery charge level 762 indicates that robot 110 does not have sufficient battery power to perform meet at the ship 720, potentially because the ship is too far away from a charging station where robot 110 can recharge. Given these limitations, some or all show targets 792 are unavailable. Accordingly, in-character behavior of robot 110 is reduced, but several other in-character behaviors remain available, including dance in a circle 710 and happy mood 740.

Referring generally to FIGS. 7-10, robot 110 may include numerous dependencies between subsystems, behavior sequences, and show outputs beyond those discussed herein. For example, behavior dependencies 760 could delineate a relationship between any of the subsystems discussed above in conjunction with FIGS. 2-4 and any of the robot behaviors discussed herein.

Figure 11:
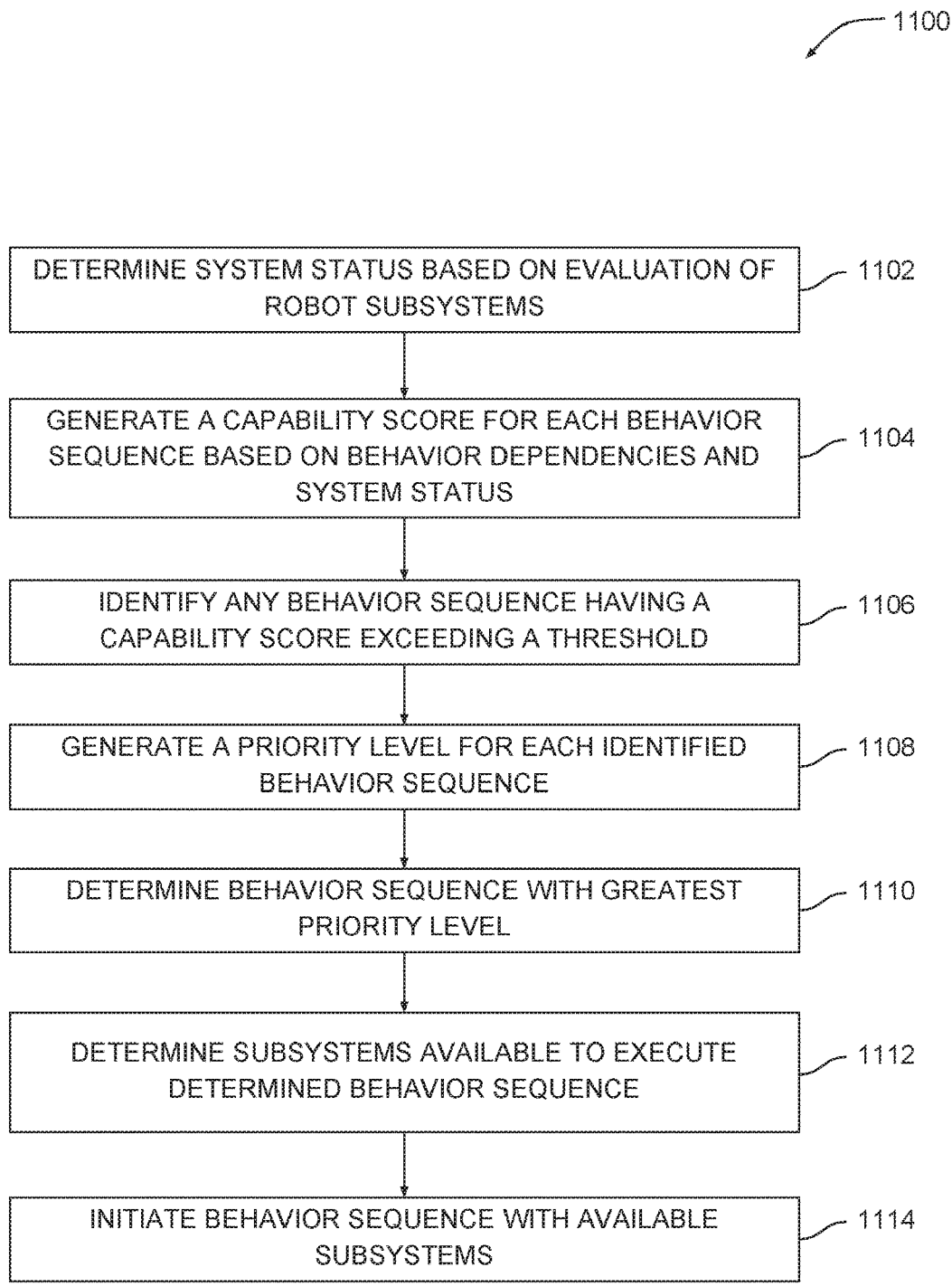
FIG. 11 is a flow diagram of method steps causing a robot to selectively perform in-character behaviors based on available robot subsystems, according to various embodiments.

In some embodiments, show subsystem 222 may generate metrics for any given behavior sequence indicating the degree to which robot 110 can perform that sequence. Show subsystem 222 may generate the metric for a given behavior sequence based on the availability of subsystems on which the sequence depends. Show subsystem 222 may then suppress certain behavior sequences by comparing the associated metrics to a threshold. When a given metric exceeds the threshold, then the associated behavior remains available. Otherwise, show subsystem 222 suppresses the sequence. Show subsystem 222 may also prioritize behavior sequences based on various factors. For example, show subsystem 222 could determine that a specific behavior has already been performed one or more times, and then deprioritize that behavior. FIG. 11 sets forth a stepwise implementation of the above techniques.

FIG. 11 is a flow diagram of method steps for causing a robot to perform in-character behaviors based on available robot subsystems, according to various embodiments. Although the method steps are described in conjunction with the systems of FIGS. 1-4 and 7-10, persons skilled in the art will understand that any system may be configured to perform the method steps in any order.

As show, a method 1100 begins at step 1102, where show subsystem 222 determines an overall system status based on evaluation of robot subsystems. Show subsystem 222 may analyze various indicators in the manner discussed above in conjunction with FIGS. 7-10 to determine system status. At step 1104, show subsystem 222 generates a capability score for each behavior sequence based on behavior dependencies on underlying subsystems and system status. In simple cases, the capability score is either a zero or a one. At step 1106, show subsystem 222 identifies any behavior sequences having a capability score exceeding a threshold. Such behavior sequences may be performed because the underlying subsystems are sufficiently intact. In some cases, show subsystem 222 identifies any behavior sequence with a non-zero capability score.

At step 1108, show subsystem 222 generates a priority level for each identified behavior sequence. Show subsystem 222 may generate a given priority level for a particular behavior sequence based on a number of different factors, including novelty of the behavior sequence, consistency with the behaviors of other show elements, resources needed to perform the sequence, and so forth. At step 1110, show subsystem 222 determines the behavior sequence with the greatest priority level. At step 1112, show subsystem 222 determines specific subsystems available to perform the behavior sequence. In some cases, a given behavior sequence may be available and also highly prioritized, but certain subsystems needed to perform that behavior may be unavailable. In such cases, show subsystem 222 may initiates the behavior sequence anyway, albeit in a reduced manner. At step 1114, show subsystem 222 initiates the behavior sequence with the available subsystems determined at step 1112.

One of the advantages of scaling in-character behavior based on subsystem availability is that any performance involving robot 110 may continue despite robot 110 suffering technical issues. Accordingly, the illusion of robot 110 actually being the character portrayed can be preserved, potentially leading to greater satisfaction of guests. Robot 110 is also configured to implement safety protocols in character and/or out of character, depending on the situation, as discussed in greater detail below in conjunction with FIGS. 12-15.

In-Character Safety Protocols

Each pair of FIGS. 12A-12B, 13A-13B, and 14A-14B sets forth a different exemplary scenario where show subsystem 222 and safety subsystem 260 interoperate to implement safety protocols. The first figure in a given pair illustrates timing diagrams indicating the occurrence of specific events and/or whether various conditions are met during a particular exemplary scenario. Those conditions generally correspond to safety risks that can occur during robot operation. The second figure in a given pair illustrates procedural decision logic according to which show subsystem 222 and safety subsystem 260 execute decisions during the exemplary scenario. The various safety protocols discussed below may be derived from existing safety standards associated with robots. In one embodiment, robot 110 implements safety protocols derived from the ANSI/ITSDF B56.5-2012 standard.

Figure 12A:
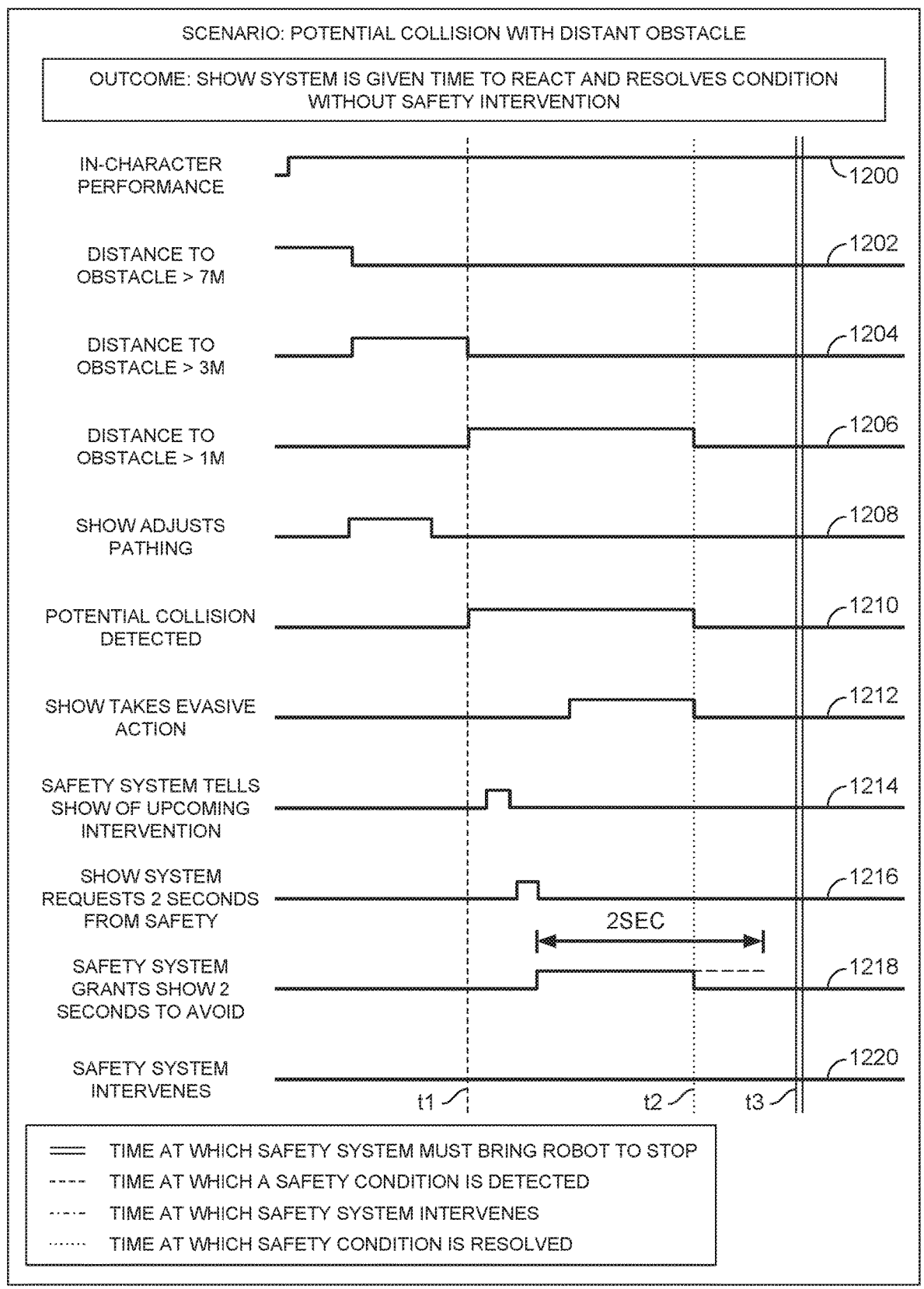
FIG. 12A-12B illustrate an example of how the autonomous robot of FIG. 1 remains in character while preventing a collision, according to various embodiments.
Figure 12B:
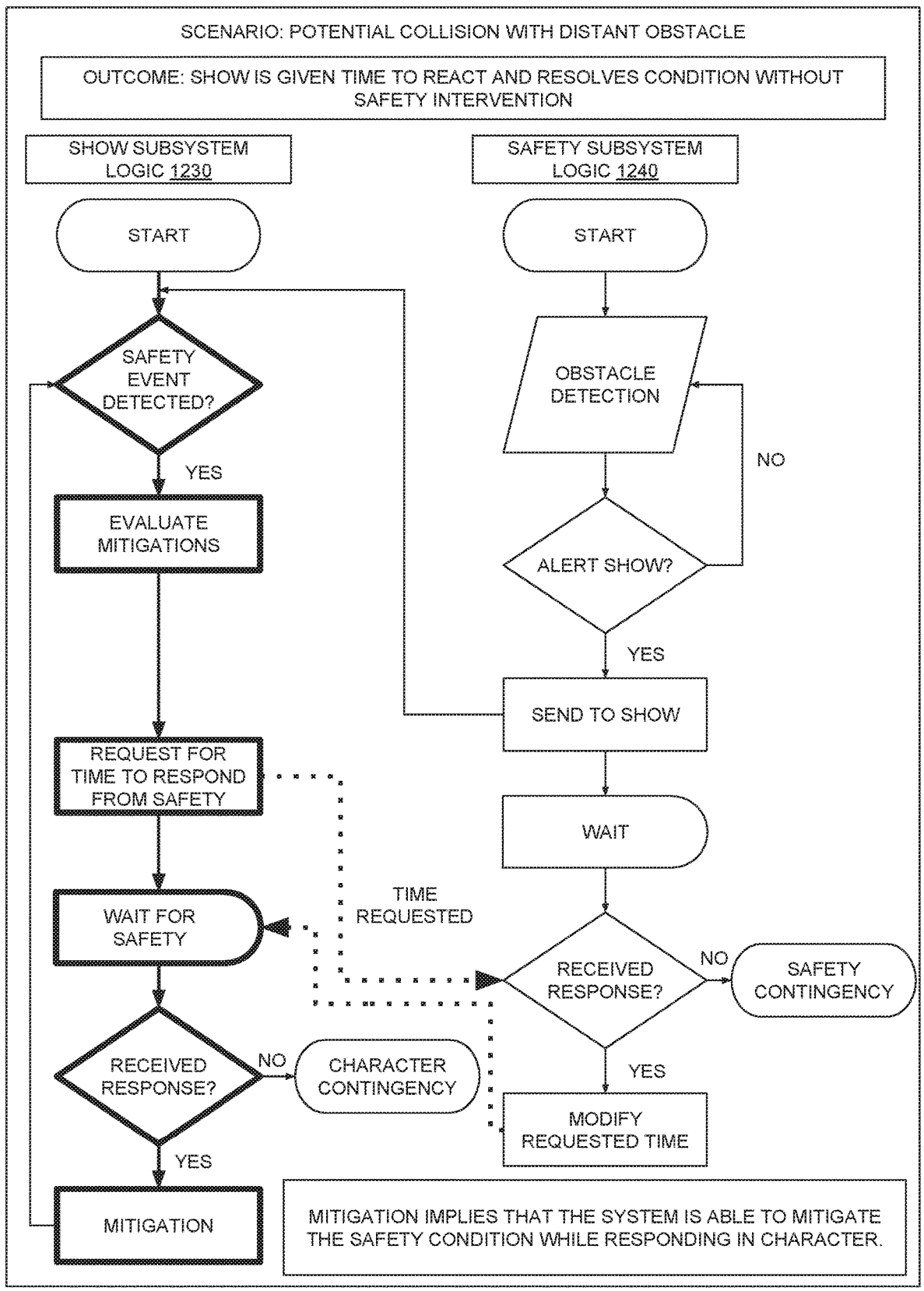

FIGS. 12A-12B illustrate an example of how the autonomous robot of FIG. 1 remains in character while preventing a collision, according to various embodiments. In the example discussed herein, robot 110 detects a potential collision with an obstacle and is able to respond in character.

As shown in FIG. 12A, timing diagrams 1200, 1202, 1204, 1206, 1208, 1210, 1212, 1214, 1216, 1218, and 1220 indicate a truth value associated with a corresponding event or condition as a function of time. A given event or condition may correspond to a safety risk such as a potential collision, among other possibilities. When a given timing diagram is high, the associated event is occurring or the corresponding condition is met. When a given timing diagram is low, the associated event is not occurring or the corresponding condition is not met.

Timing diagram 1200 indicates whether robot 110 operates in character or out of character during a time span. According to timing diagram 1200, robot 110 initially operates out of character for a short time, and then operates in character for all of the remaining time. Timing diagram 1202 indicates whether the distance between robot 110 and the obstacle is greater than 7 meters (M). According to timing diagram 1202, robot 110 initially resides greater than 7M away from the obstacle but then approaches to within 7M of the obstacle. Similarly, timing diagram 1204 indicates whether the distance between robot 110 and the obstacle is greater than 3M. According to timing diagram 1204, robot 110 initially resides greater than 3M away from the obstacle but then approaches to within 3M of the obstacle. Timing diagram 1206 indicates whether the distance between robot 110 and the obstacle is greater than 1M. According to timing diagram 1206, robot 110 initially resides greater than 1M away from the obstacle but then approaches to within 1M of the obstacle. The various conditions associated with timing diagrams 1202, 1204, and 1206 may be evaluated based on sensors data captured by robot 110, including that associated with 3D LIDAR 244, 2D LIDAR 274, and other spatial sensors. Based on timing diagrams 1202, 1204, and 1206 one may recognize that robot 110 is approaching the obstacle.

Timing diagram 1208 indicates a specific time range when show subsystem 222 adjusts robot pathing to avoid the obstacle. This adjustment is unsuccessful, though. Timing diagram 1210 indicates that safety subsystem 260 subsequently detects a potential collision with the obstacle. Timing diagram 1212 indicates a time range when show subsystem 222 executes evasive action (while in character) to avoid the obstacle. Show subsystem 222 executes this evasive action in response to safety subsystem 260 notifying show subsystem 222 of a planned intervention, as indicated in timing diagram 1214. In response to this planned intervention, show subsystem 222 requests additional response time from safety subsystem 260, as indicated in timing diagram 1216. Safety subsystem 260 grants an additional 2 seconds, as indicated by timing diagram 1218. During this additional 2 seconds, show subsystem 222 executes the evasive action mentioned above and indicated by timing diagram 1212. According to timing diagram 1220, safety subsystem 260 does not intervene and the collision is avoided.

In short, safety subsystem 260 detects a potential collision at time t1 and notifies show subsystem 222. Show subsystem 222 implements evasive action and resolves the safety condition by time t2. Accordingly, safety subsystem 260 need not implement a planned intervention at time t3, and robot 110 remains in character up until, and beyond, that time. The various timing diagrams shown in FIG. 12A correspond to procedural decision logic illustrated in FIG. 12B.

Referring now to FIG. 12B, in handling the exemplary scenario discussed above, show subsystem 222 implements show subsystem logic 1240 and safety subsystem 260 implements safety subsystem logic 1240. Specific portions of show subsystem logic 1230 are emphasized to indicate that show subsystem 222 generally remains in control of robot 110 during the exemplary collision scenario discussed herein.

Initially, safety subsystem logic 1240 detects the obstacle, as also indicated by timing diagrams 1204, 1206, and 1208. Safety subsystem logic 1240 then alerts show subsystem logic 1230, as indicated by timing diagram 1214. In response, show subsystem logic 1230 evaluates different mitigations. A given mitigation could include, for example, robot 110 swerving to avoid the obstacle. Show subsystem logic 1230 selects a mitigation and then requests additional time from safety subsystem logic 1240, as indicated in timing diagram 1216. Safety subsystem logic 1240 grants the additional time, also indicated in timing diagram 1218. Show subsystem 1230 then implements the mitigation by performing an evasive action in character, as indicated by timing diagrams 1200 and 1212.

By implementing the interoperating logic discussed above, robot 110 is capable of maintaining adherence to specific safety standards while also maximizing the extent to which in-character behavior is maintained. Robot 110 may also implement similar logic in response to safety conditions that merit a temporary break in character, as discussed in greater detail below in conjunction with FIGS. 13A-13B.

Figure 13A:
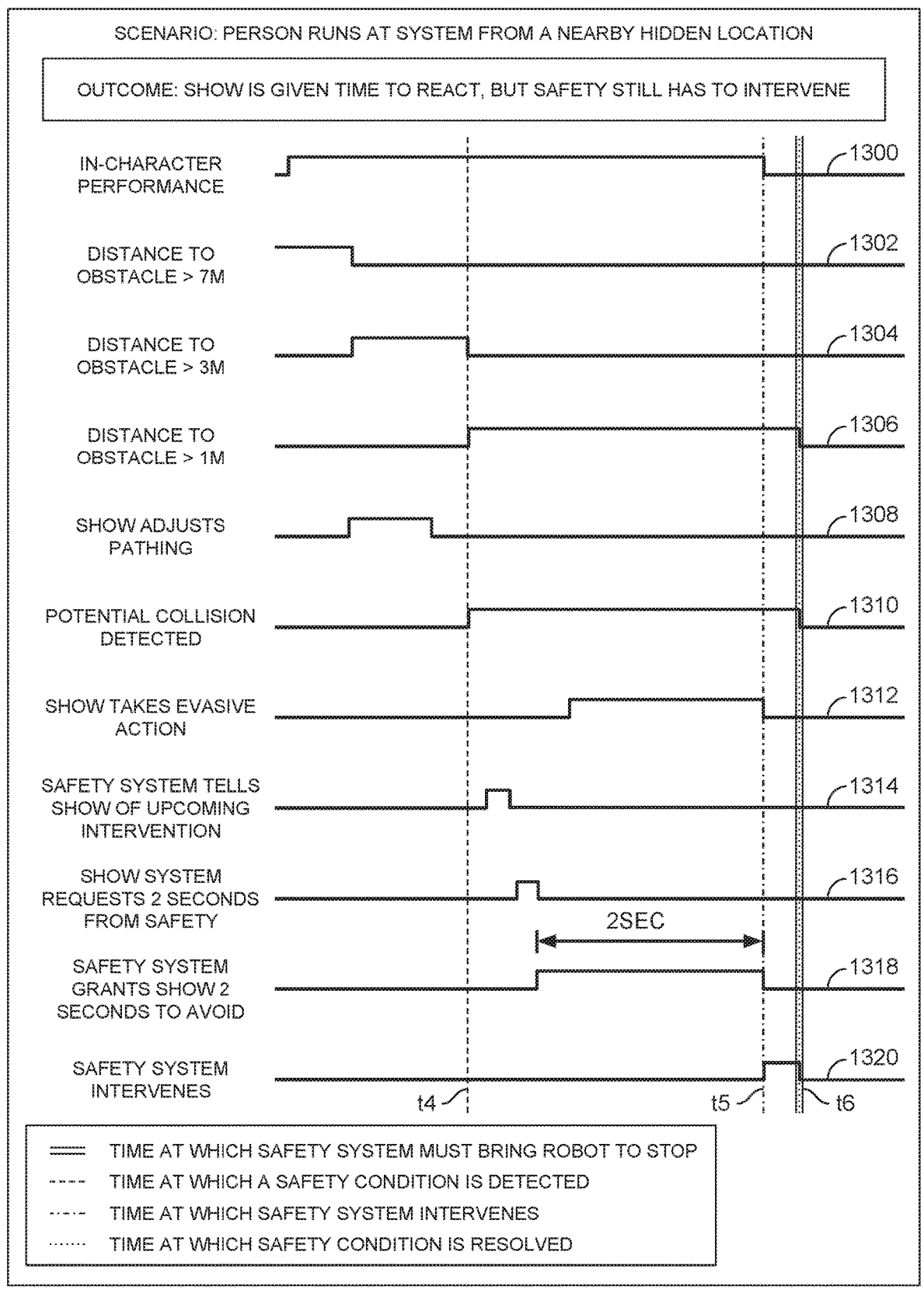
FIGS. 13A-13B illustrate an example of how the autonomous robot of FIG. 1 temporarily breaks character to prevent a collision, according to various embodiments.
Figure 13B:
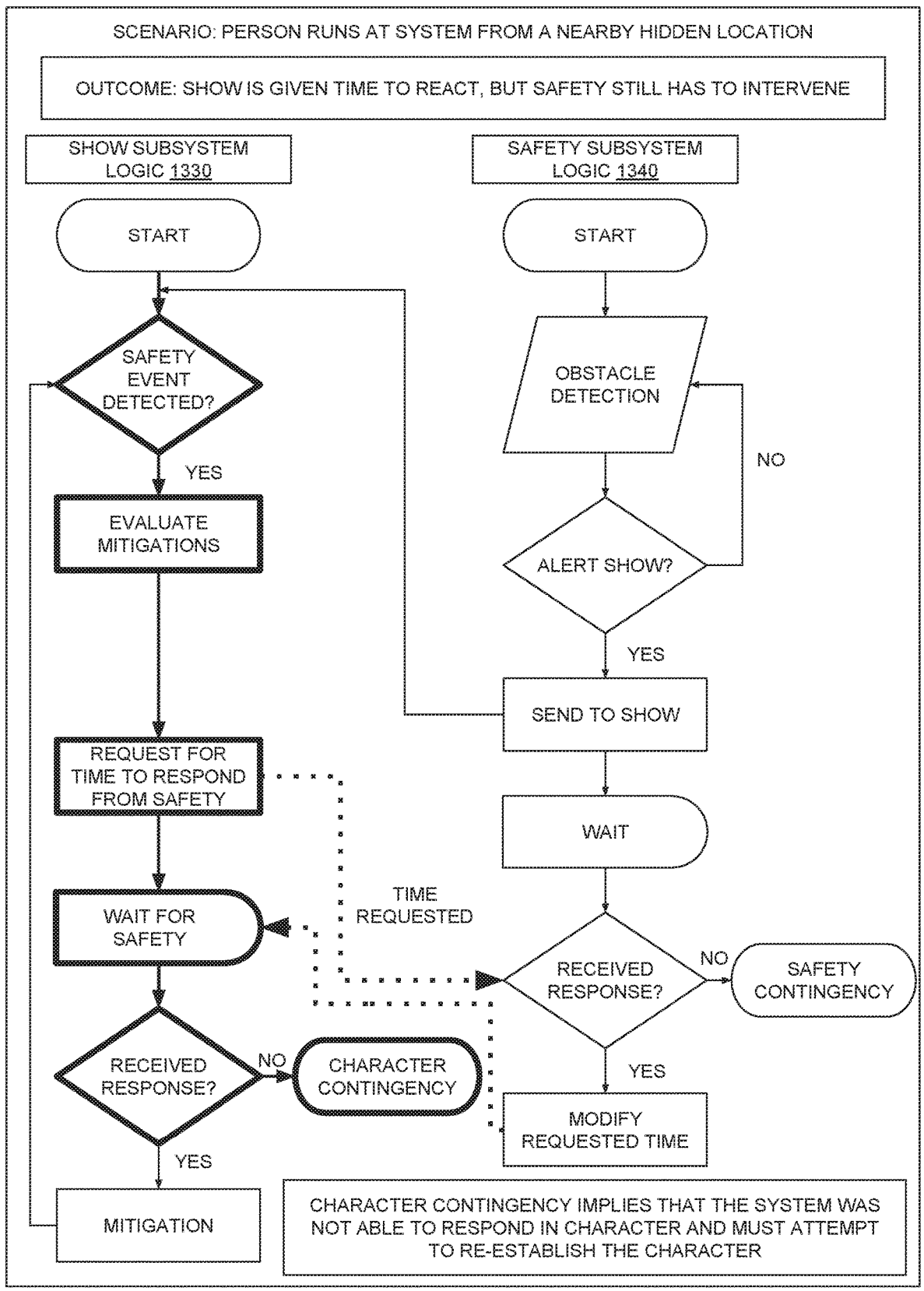

FIGS. 13A-13B illustrate an example of how the autonomous robot of FIG. 1 temporarily breaks character to prevent a collision, according to various embodiments. In the example discussed herein, robot 110 detects that a person unexpectedly runs at robot 110, causing robot 110 to implement a safety protocol.

As shown in FIG. 13A, timing diagrams 1300, 1302, 1304, 1306, 1308, 1310, 1312, 1314, 1316, 1318, and 1320 indicate truth values associated with the same events and conditions as those discussed above in conjunction with FIG. 12A. Because robot 110 responds differently to the scenario discussed herein, however, the actual truth values of these timing diagrams is different from those shown in FIG. 12A.

Timing diagram 1300 initially indicates that robot 110 operates in character. Timing diagrams 1302, 1304, and 1306 indicate that robot 110 approaches an obstacle, which in this case is a person who is actively moving towards robot 110. Show subsystem 222 adjusts pathing to avoid the person, as indicated in timing diagram 1308, but a potential collision is still detected, as indicated in timing diagram 1310. Safety subsystem 260 notifies show subsystem 222 of an upcoming intervention, as indicated in timing diagram 1314. Show subsystem 222 requests additional time, as indicated in timing diagram 1316. Safety subsystem 260 grants this time, as indicated in timing diagram 1318. Show subsystem 222 attempts to take evasive action to avoid the obstacle, as indicated in timing diagram 1312, but the potential collision remains imminent, as indicated in timing diagram 1310. Because safety subsystem 222 was unable to mitigate the safety condition, safety subsystem 260 intervenes and robot 110 temporarily drops character, as indicated in timing diagrams 1300 and 1320, and robot 110 temporarily halts motion. Subsequently, show subsystem 222 is permitted to regain in-character operations.

In summary, safety subsystem 260 detects a potential collision at time t4 and notifies show subsystem 222. Show subsystem 222 implements an unsuccessful evasive and safety subsystem 260 must intervene at time t5. The safety condition is resolved at time t6. Accordingly, robot 110 temporarily drops character but is then able to continue performing after the safety condition is resolved. Procedural decision logic corresponding to these timing diagrams is discussed below in conjunction with FIG. 13B.

Referring now to FIG. 13B, show subsystem 222 implements show subsystem logic 1340 and safety subsystem 260 implements safety subsystem logic 1340 during the above-described scenario. Specific portions of show subsystem logic 1230 are emphasized to indicate that although show subsystem 222 attempts to resolve the safety condition, show subsystem logic 1340 must relinquish control of robot 110 temporarily.

Safety subsystem logic 1340 first detects the unexpected person via obstacle detection, as also indicated by timing diagrams 1304, 1306, and 1308. Safety subsystem logic 1340 notifies show subsystem logic 1330, as indicated by timing diagram 1314. Show subsystem logic 1330 evaluates different mitigations and then requests additional time to execute a mitigation, as indicated in timing diagram 1316. Safety subsystem logic 1340 grants the additional time, as indicated by timing diagram 1218, but the mitigating evasive action performed by show subsystem 222 is unsuccessful, as indicated via timing diagrams 1310 and 1312. Consequently, safety subsystem logic 260 intervenes, as indicated by timing diagram 1320, and enforces a character contingency to temporarily break character. In this context, a character contingency is a temporary departure from ordinary in-character behavior. Show subsystem 222 is permitted to return to in-character behavior after the safety condition is resolved.

The logic discussed above permits robot 110 to maintain adherence to safety standards while operating in character up until a point when those standards would be violated. At that point, in-character behavior is suspended. Robot 110 may also permanently break character and terminate a performance if required to do so, as discussed in greater detail below in conjunction with FIGS. 14A-14B.

Figure 14A:
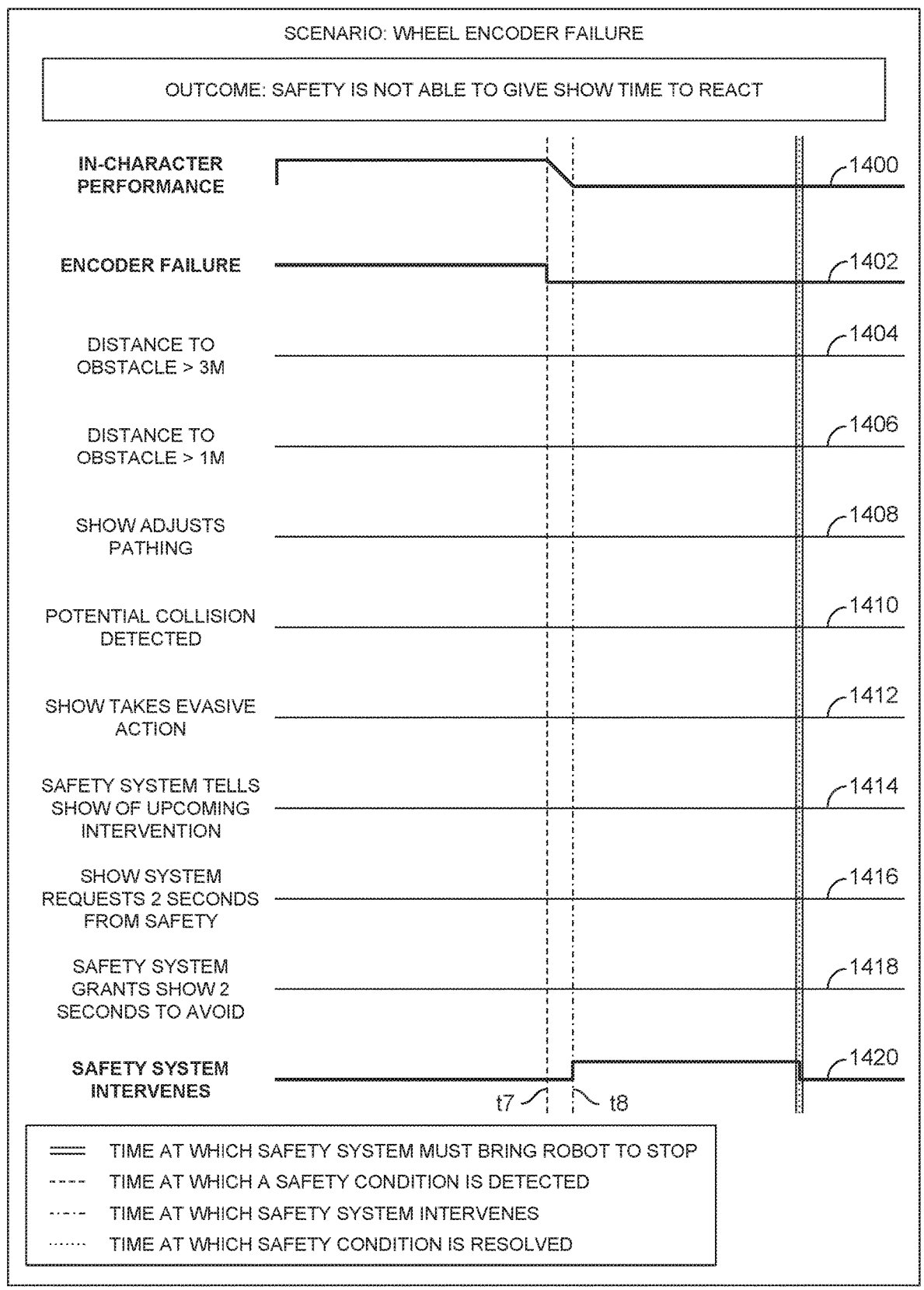
FIGS. 14A-14B illustrate an example of how the autonomous robot of FIG. 1 breaks character in response to a subsystem failure, according to various embodiments.
Figure 14B:
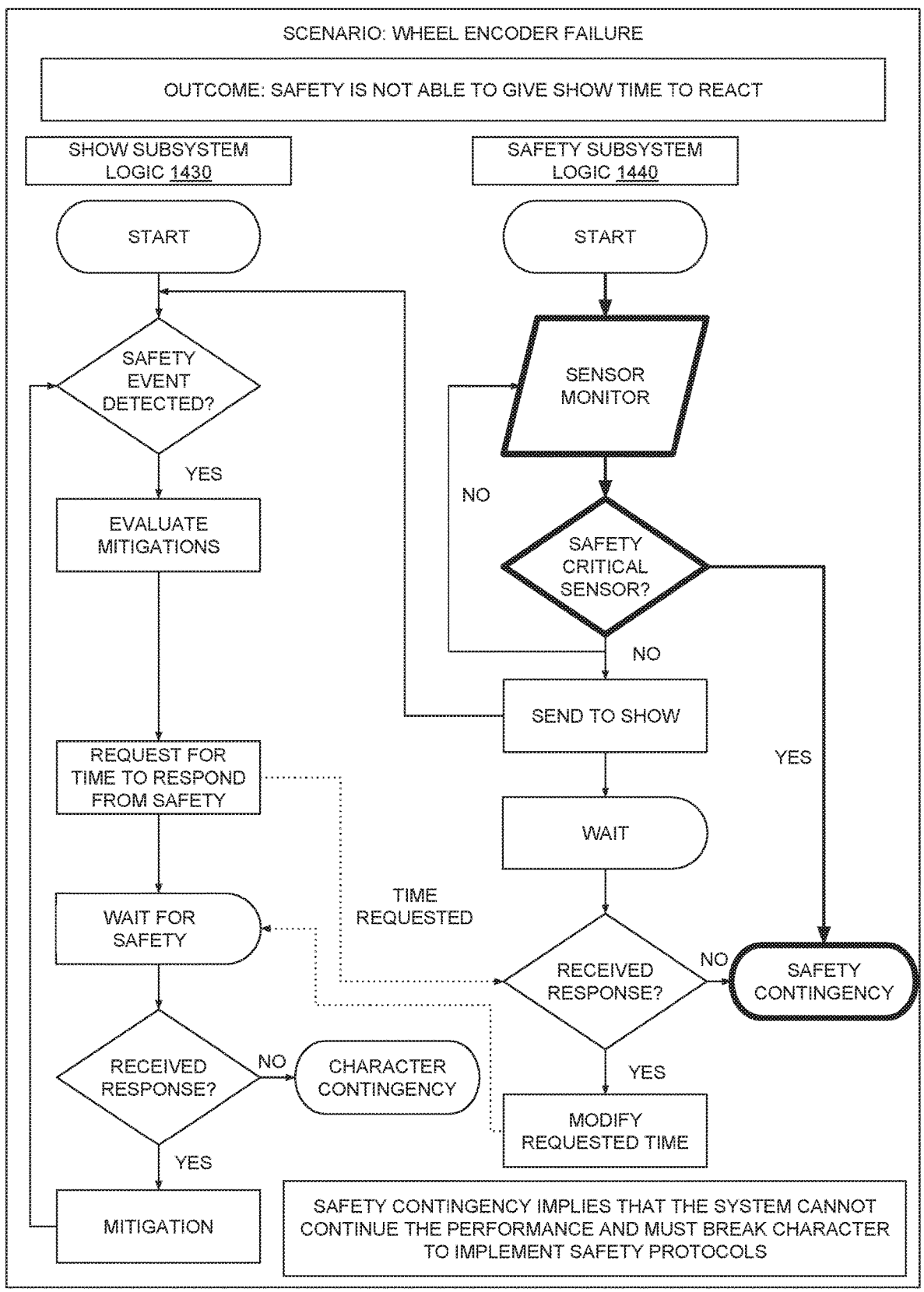

FIGS. 14A-14B illustrate an example of how the autonomous robot of FIG. 1 breaks character in response to a subsystem failure, according to various embodiments. In the example discussed herein, robot 110 determines that a wheel encoder has failed and in-character operations must be terminated.

As shown in FIG. 14A, timing diagrams 1400, 1402, 1404, 1406, 1408, 1410, 1412, 1414, 1416, 1418, and 1420 indicate truth values associated with some of the same events and conditions as those discussed above in conjunction with FIGS. 12A and 13A. Timing diagram 1402, however, indicates that an encoder failure occurs during in-character performance at time t7. Because the wheel encoder is a safety critical sensor integral to avoiding collisions with people, safety subsystem 260 quickly intervenes and causes robot to stop at time t8. Robot 110 breaks character and the performance terminates, potentially avoiding any safety issues.

Referring now to FIG. 14A, show subsystem 222 and safety subsystem 260 implement show subsystem logic 1440 and safety subsystem 260 implements safety subsystem logic 1440 to implement a safety contingency when the wheel encoder failure occurs. Show subsystem logic 1440 is not provided with any option for mitigating the issue because there are no safe mitigations available that would comply with the relevant safety standards.

Figure 15:
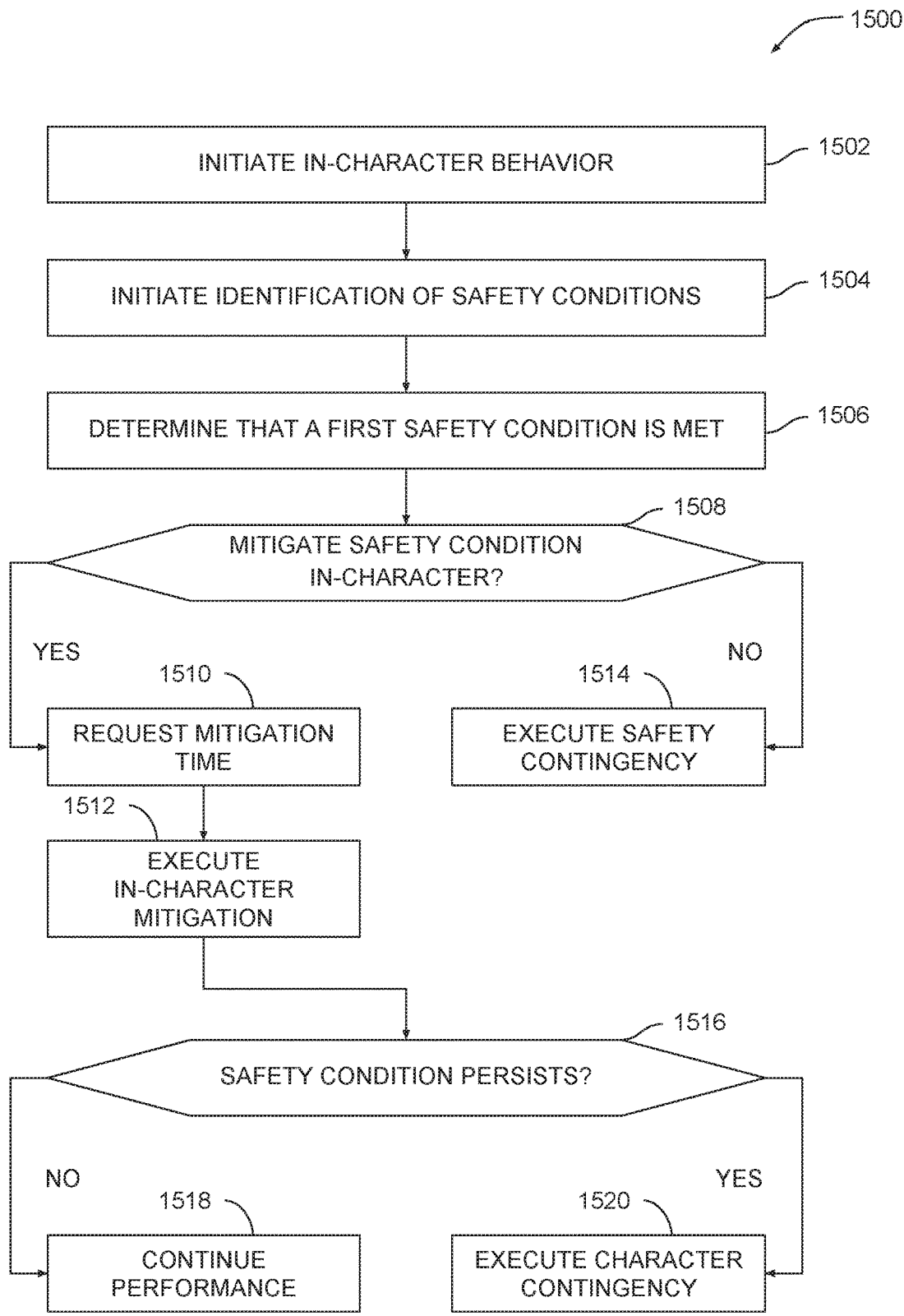
FIGS. 15 is a flow diagram of method steps for adjusting performance operations of an autonomous robot in response to a safety condition, according to various embodiments.

Referring generally to FIGS. 12A-14B, the above-described scenarios illustrate several possible ways that show subsystem 222 and safety subsystem 260 interoperate to maximize in-character behavior without sacrificing adherence to safety standards. Although the particular safety conditions may vary, the basic interoperation of show subsystem 222 and safety subsystem 260 limits the degree to which robot 110 must break character while mitigating safety risks. FIG. 15 sets forth a generic approach that is implemented cooperatively by show subsystem 222 and safety subsystem 260.

FIG. 15 is a flow diagram of method steps for adjusting the performance operations of an autonomous robot in response to a safety condition, according to various embodiments. Although the method steps are described in conjunction with the systems of FIGS. 1-4 and 12A-14B, persons skilled in the art will understand that any system may be configured to perform the method steps in any order.

As shown, a method 1500 begins at step 1502, where robot 110 initiates in-character behavior. The in-character behavior may be associated with a performance in which robot 110 participates or may occur when robot 110 freely roams the theme park. At step 1504, robot 110 initiates the identification of potential safety issues, In doing so, robot 110 analyzes sensor data reflecting the surrounding environment and also monitors internal subsystems to detect any failure conditions. At step 1506, robot 110 determines that a first safety condition is met.

The first safety condition could be a potential collision with a stationary obstacle, as described above in conjunction with FIGS. 12A-12B. Alternatively, the first safety condition could occur when a guest 150 suddenly runs towards robot 110, as discussed above in conjunction with FIGS. 13A-13B. The first safety condition could also occur when a robot subsystem fails, as discussed above in conjunction with FIGS. 14A-14B. Any of these safety conditions correspond to potential safety risks that need to be mitigated. Robot 110 may also determine that other safety conditions have occurred at step 1506, For example, robot 110 could determine that a battery charge level as decreased to a critical level, potentially preventing evasive action. Robot 110 could also identify that inclement weather threatens the accurate collection of sensor data, which could interfere with collision detection.

At step 1508, robot 110 determines whether the safety condition can be mitigated in character. If the safety condition meets certain safety criteria, such as the wheel encoder failure discussed in conjunction with FIGS. 14A-14B, then the method 1500 proceeds to step 1514 and robot 110 drops character to execute a safety contingency. Otherwise, the method 1500 proceeds to step 1510. At step 1510, show subsystem 222 within robot 110 requests mitigation time from safety subsystem 260 within robot 110. The mitigation time provides robot 110 with time to attempt mitigating the safety condition while remaining in character. At step 1512, robot 110 executes the in-character mitigation. For example, robot 110 could swerve around an obstacle while continuing to emit happy sounds, thereby preserving the appearance that robot 110 is happy.

At step 1516, robot 110 evaluates whether the first safety condition persists. If the first safety condition does not persist, meaning that the mitigation was successful, then the method proceeds to step 1518 and the performance or other in-character behavior continues. Alternatively, if the safety condition persists, meaning that the mitigation failed, then the method 1500 proceeds to step 1520, where robot 110 executes a character contingency. In so doing, robot 110 may temporarily break character in order to allow the first safety condition to be resolved, and then return to character.

Referring generally to FIGS. 12A-14, the various subsystems within robot 110 are configured to interoperate in the manner described to confer the advantageous feature of allowing robot 110 to maintain safety and in-character behavior simultaneously. Accordingly, robot 110 may be suitable for deployment within environments where numerous people may reside, such as theme parks, among others. Robot 110 therefore represents a significant improvement over conventional industrial robots that do not maintain continuous in-character behavior and may also pose a safety threat to nearby people.

In addition to the various safety mechanisms built into robot 110, robot 110 is also configured to address complex social scenarios that would be challenging or impossible for conventional robots to manage. Various techniques implemented by robot 110 for interacting socially with guests 150 are discussed in greater detail below in conjunction with FIGS. 16-19.

Programmatic Interpretation of Social Cues

Figure 16:
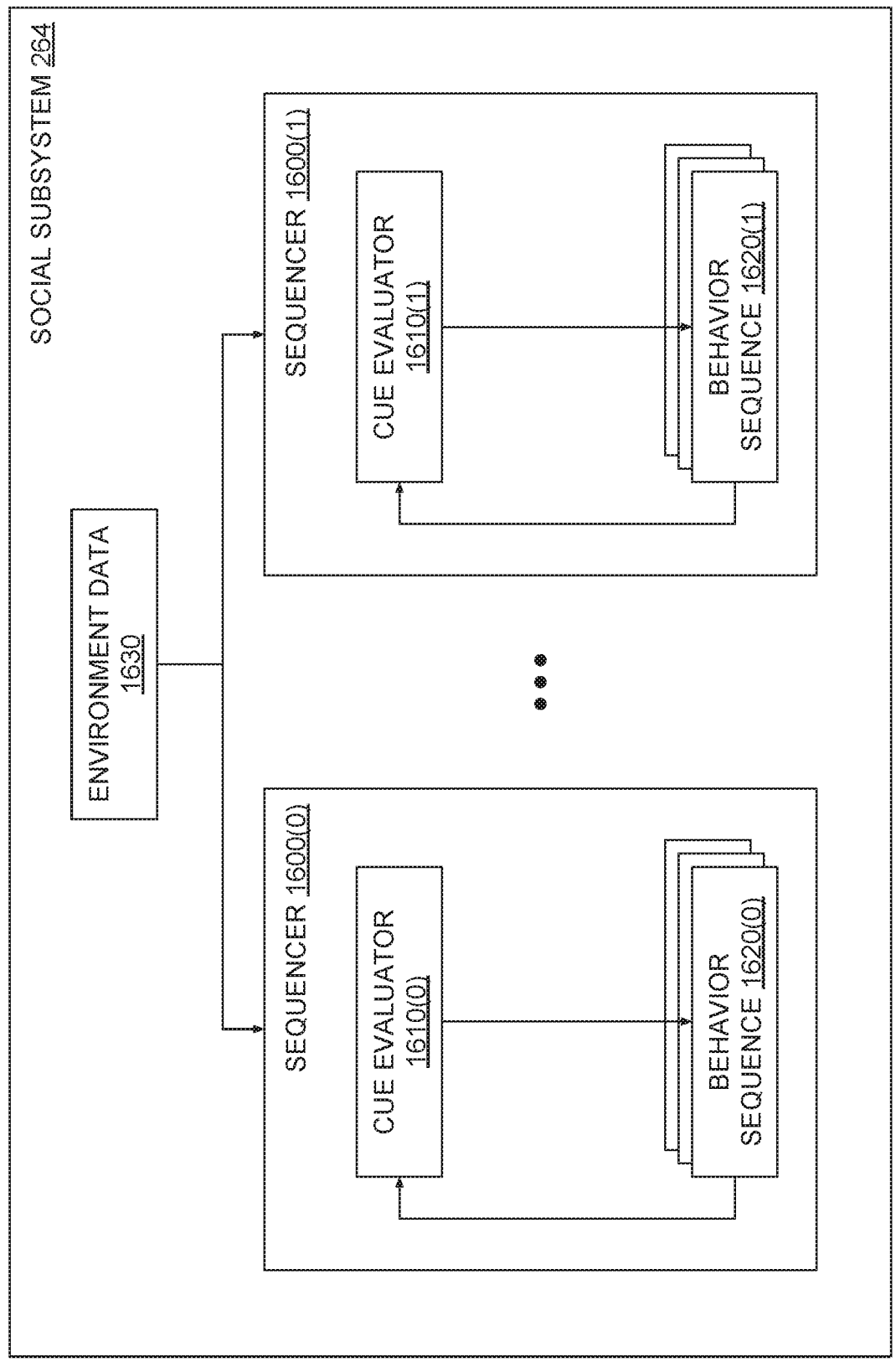
FIG. 16 is a more detailed illustration of the social subsystem of FIG. 2, according to various embodiments.

FIG. 16 is a more detailed illustration of the social subsystem of FIG. 2, according to various embodiments. Social subsystem 264 is generally responsible for analyzing the social environment within which robot 110 operates and then coordinating specific robot behaviors that may comply with generally accepted social norms.

As shown, social subsystem 264 includes a plurality of sequencers 1600. A given behavioral sequencer 1600 is configured to identify when a specific social situation occurs and to then cause robot 110 to implement one or more behaviors that are relevant in that social situation. In a simple example, a given sequencer 1600 could determine that a guest 150 wishes to hug robot 110, and then cause robot 110 to perform embracing movements. Robot 110 may perform these behaviors in character or out of character, depending on the situation.

Each sequencer 1600 includes a cue evaluator 1610 and a set of behavioral sequences 1620. The cue evaluator 1610 within a given sequencer 1600 is configured to detect one or more related social cues. Behavior sequence 1620 includes different behaviors that may be performed in response to those cues, potentially in a particular sequence. Because social subsystem 264 includes many different sequencers 1600, robot 110 may be configured to navigate a wide variety of different social situations by appropriately responding to numerous detected cues.

Sequencers 1600 are configured to process environment data 1630 to detect social cues during real-time operation of robot 110. Environment data 1630 may include raw sensor data as well as metadata generated based on sensor data. For example, environment data could include 3D LIDAR point cloud data as well as data indicating specific regions of 3D space occupied by guests 150, Some or all sequencers 1600 may actively process environment data 1630 at any given time to detect different social cues.

For example, sequencer 1600(0) could implement cue evaluator 1610(0) to evaluate whether a nearby crowd of guests wants to take a picture, sequencer 1600(1) could implement cue evaluator 1610(1) to evaluate whether a nearby child wishes to dance. If a given sequencer 1600 detects a corresponding social cue, then that particular sequencer 1600 may cause robot 110 to perform an associated behavior sequence 1620. In the above example, if cue evaluator 1610(0) determines that the nearby crowd wishes to take a picture, then sequencer 1600(0) could cause robot 110 to pose with that crowd of people.

Figure 17A:
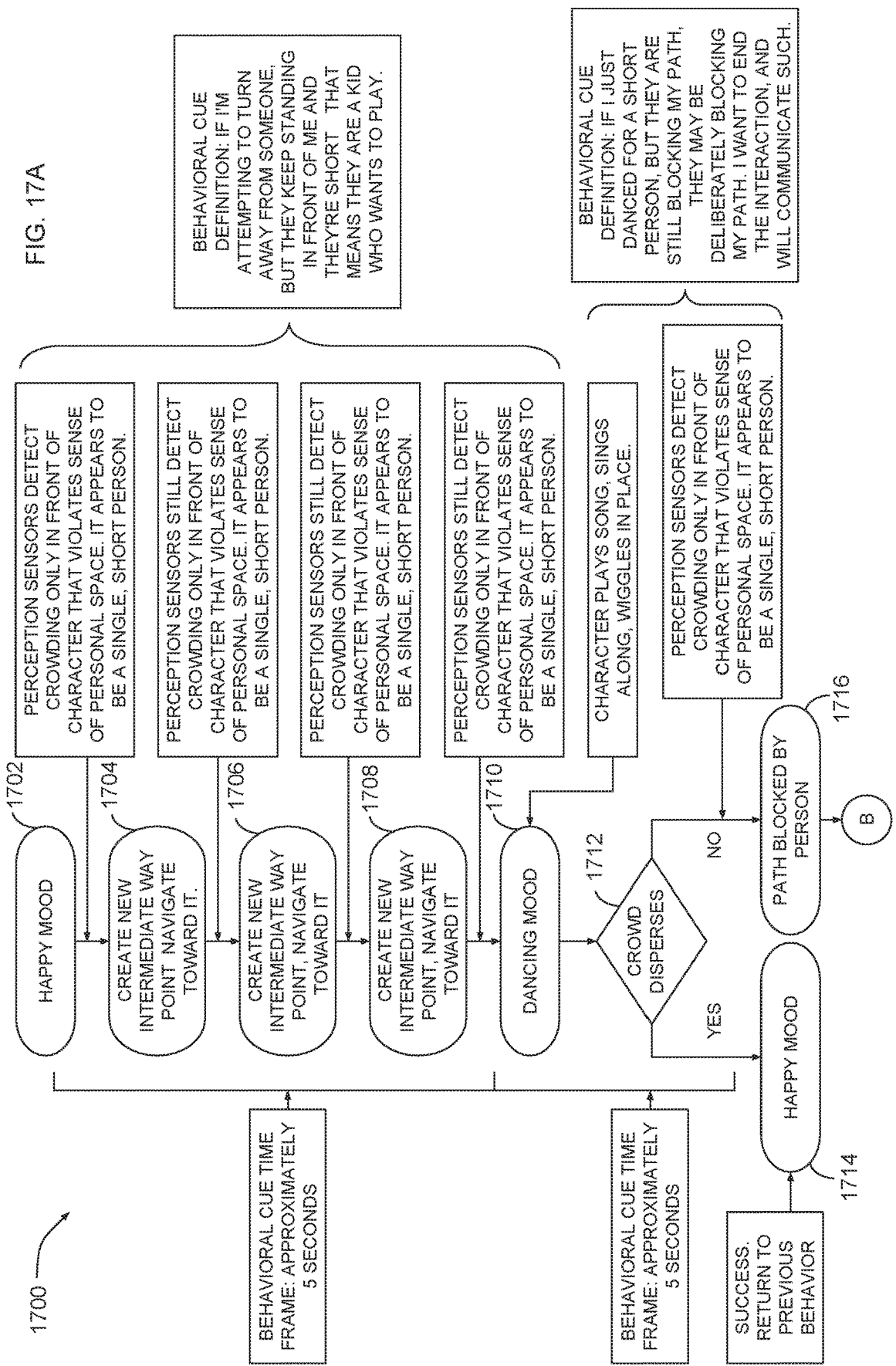
FIGS. 17A-17B illustrate exemplary logic implemented by the autonomous robot of FIG. 1 when interacting with one or more theme park guests, according to various embodiments.
Figure 17B:
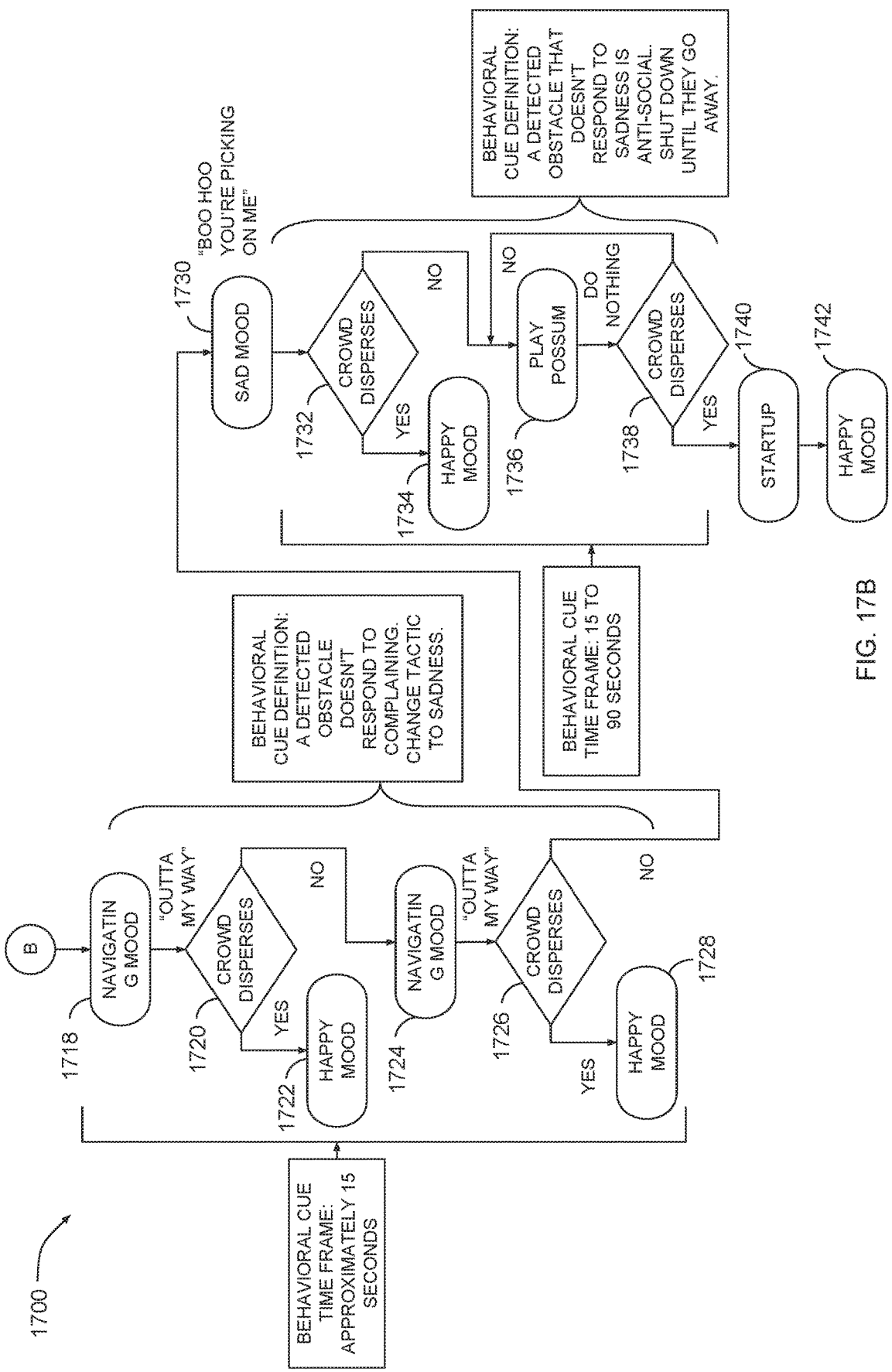
Figure 18:
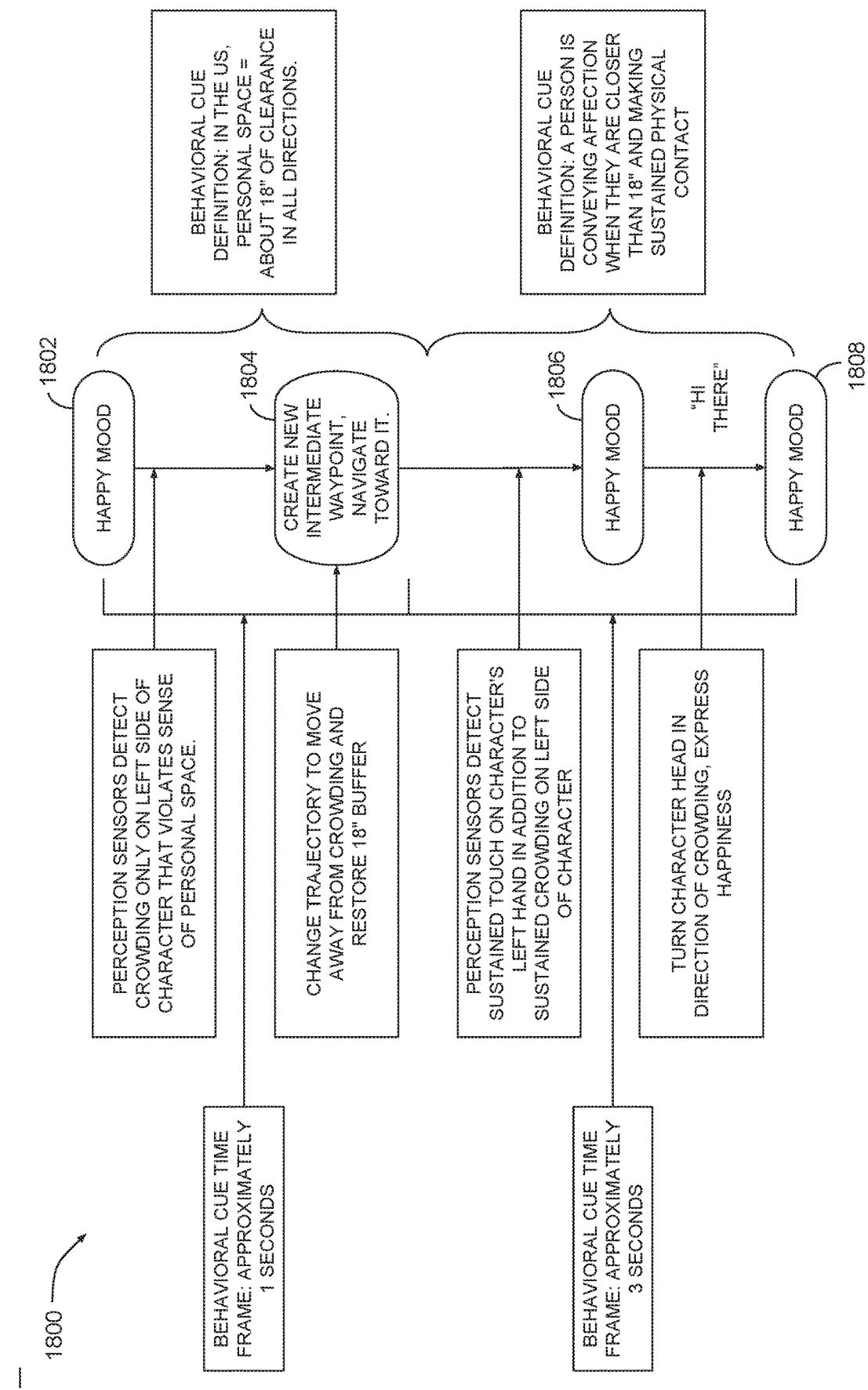
FIG. 18 illustrates exemplary logic implemented by the autonomous robot of FIG. 1 when interacting with a theme park guest, according to various embodiments.

In operation, a given sequencer 1600 implements a cue evaluator 1610 and a behavior sequence 1620 in a tightly coupled feedback loop that involves detecting a particular cue, performing a behavior associated with that cue, then re-evaluating environment data 1630 to identify additional, potentially related, cues. If a related cue is detected, then the sequencer 1600 may implement another behavior in the behavior sequence 1620. FIGS. 17A-17B and 18 set forth two different examples of how social subsystem 264 detects and responds to social cues associated with specific social situations.

FIGS. 17A-17B illustrate exemplary logic implemented by the autonomous robot of FIG. 1 when interacting with one or more theme park guests, according to various embodiments. In the example discussed herein, robot 110 is faced with a social situation involving a guest 150 who wishes to obstruct robot 110. Social logic 1700 describes how social subsystem 264 coordinates various in-character and out-of-character responses to this situation. In particular, social logic 1700 includes various states that robot 110 may occupy and different actions that robot 110 may perform when responding to the situation.

As shown, robot 110 initially occupies state 1702, where robot 110 exudes in-character behaviors associated with a happy mood. Based on environment data 1630, robot 110 detects the presence of a guest 150 directly in front of robot 110 who appears to be short in stature and therefore likely a child. The detected guest 150 may reside within a perimeter of "personal space" surrounding robot 110 that has a configurable radius. In response, robot 110 executes action 1704 in order to create, and navigate towards, a new navigational waypoint.

However, based on environment data 1630 robot 110 still detects the presence of the guest 150 directly in front of robot 110. Accordingly, robot 110 performs action 1706 and repeats the process of creating and navigating towards a new navigational waypoint. Analysis of environment data 1630 indicates that the presence of the guest 150 remains, and so robot 110 attempts to circumnavigate the guest one last time via action 1708. Robot 110 is unsuccessful and environment data 1630 continues to indicate the presence of the guest 150 directly in front of robot 110.

At this point robot 110 identifies a specific social cue indicating that the guest 150 is obstructing the path of robot 110 and, perhaps, wishes to play. A given cue evaluator 1610 may be configured to detect this specific situation and could, for example, indicate that the likelihood of a person obstructing robot 110 is exceptionally high. In one embodiment, the given cue evaluator 1610 includes a machine learning model trained based on environment data to detect this particular social cue based on one or more conditions, such as the repeated detection of a person directly in front of robot 110.

In response to this social cue, robot 110 initiates execution of a corresponding behavior sequence 1620 and performs action 1710, whereby robot perform in-character dancing motions in an attempt to socially engage with the guest 150. A cue evaluator 1610 may then determine, via action 1712, whether the path is clear and the guest 150 has left. If the path is clear, robot 110 transitions to state 1714 and returns to the happy mood.

Otherwise, robot 110 transitions to state 1716 and again determines that the guest 150 persists in obstructing robot 110. At this point the cue evaluator 1610 may identify a related social cue indicating that the guest 150 is intentionally obstructing robot 110 in a less than playful manner. Such behavior is generally unacceptable because the entertainment value of robot 110 relative to other guests 150 may be diminished. Also, intentional obstruction of others is a negative behavior that should not be encouraged within a family-friendly environment such as a theme park.

Referring now to FIG. 17B, robot 110 enters state 1718 and attempts to assertively dissuade the continued obstruction by stating "outta my way!" Then, via action 1720, robot 110 evaluates whether the presence of the guest 150 persists. If the guest continues to obstruct robot 110, then robot 110 enters state 1722, again attempts dissuasion, and then performs action 1726 to re-evaluate the situation (via cue evaluator 1610). Under circumstances where the above actions fail to remove the obstructing person within a given time frame, cue evaluator 1610 may implement additional behaviors in the associated behavior sequence 1620 or, alternatively, may relinquish control over the behavior of robot 110 and allow another conditional evaluator to coordinate a different behavior sequence.

In this example, robot 110 changes tactics and transitions to state 1730, wherein robot 110 exudes sadness in an effort to appeal to the sympathies of the guest 150. As with previous actions, robot 110 subsequently re-evaluates the situation and returns to a happy mood if the action is successful. If the guest 150 does not respond to sadness, then robot 110 refuses to engage in further social interactions. Generally, insensitivity to sadness is considered an antisocial behavior and further engagement with the guest 150 promotes this unacceptable behavior. Robot 110 enters state 1736 and does nothing until the relevant cue evaluator 1610 determines that the guest 150 has departed. When the guest finally leaves, robot 110 proceeds through states 1740 and 1742.

The above example is especially relevant to theme park deployments of robot 110 because this particular scenario occurs with a non-negligible frequency. In order to address these types of situations, social subsystem 246 is pre-programmed with sufficient cue evaluators 1610 and behavior sequences 1620 to perform any of the above actions. In some embodiments, social subsystem 246 exhausts all behaviors in a given behavior sequence 1620 and then transitions to another sequencer 1600. In other embodiments, each sequencer 1610 is programmed to coordinate an entire class of social interactions. Another exemplary social situation which social subsystem 246 is configured to handle is described below in conjunction with FIG. 18.

FIG. 18 illustrates exemplary logic implemented by the autonomous robot of FIG. 1 when interacting with a theme park guest, according to various embodiments. In this example, robot 110 recognizes and participates in a social situation involving a guest 150 who wishes to walk alongside robot 110 in a friendly manner. Social logic 1800 describes how social subsystem 264 coordinates various in-character responses to this situation. Similar to social logic 1700, social logic 1800 includes various states that robot 110 may occupy and different actions that robot 110 may perform when responding to the situation.

As shown, robot 110 initially occupies state 1802, where robot 110 exudes in-character behaviors associated with a happy mood. Based on environment data 1630, robot 110 detects the presence of a guest 150 on the left side of robot 110 and within a perimeter of personal space surrounding robot 110. Via the relevant cue evaluator 1610, robot 110 interprets the proximity of guest 150 as a social cue that robot 110 should move out of the way to respect the personal space of the guest. In response, robot 110 executes action 1804 in order to create, and navigate towards, a new navigational waypoint, thereby avoiding conflicts between the personal space of the guest and that of robot 110, Subsequently, robot 110 detects sustained touch on left arm 242(1). Cue evaluator 1610 may interpret this interaction to mean that the guest 150 wishes to express affection. Accordingly, robot 110 enters state 1806 and performs associated behaviors in the relevant behavior sequence 1620. For example, robot 110 may exude a happy mood and engage socially with the guest 150. Robot 110 may also continue to state 1808 and perform additional behaviors in the sequence, including looking at the guest 150.

Figure 19:
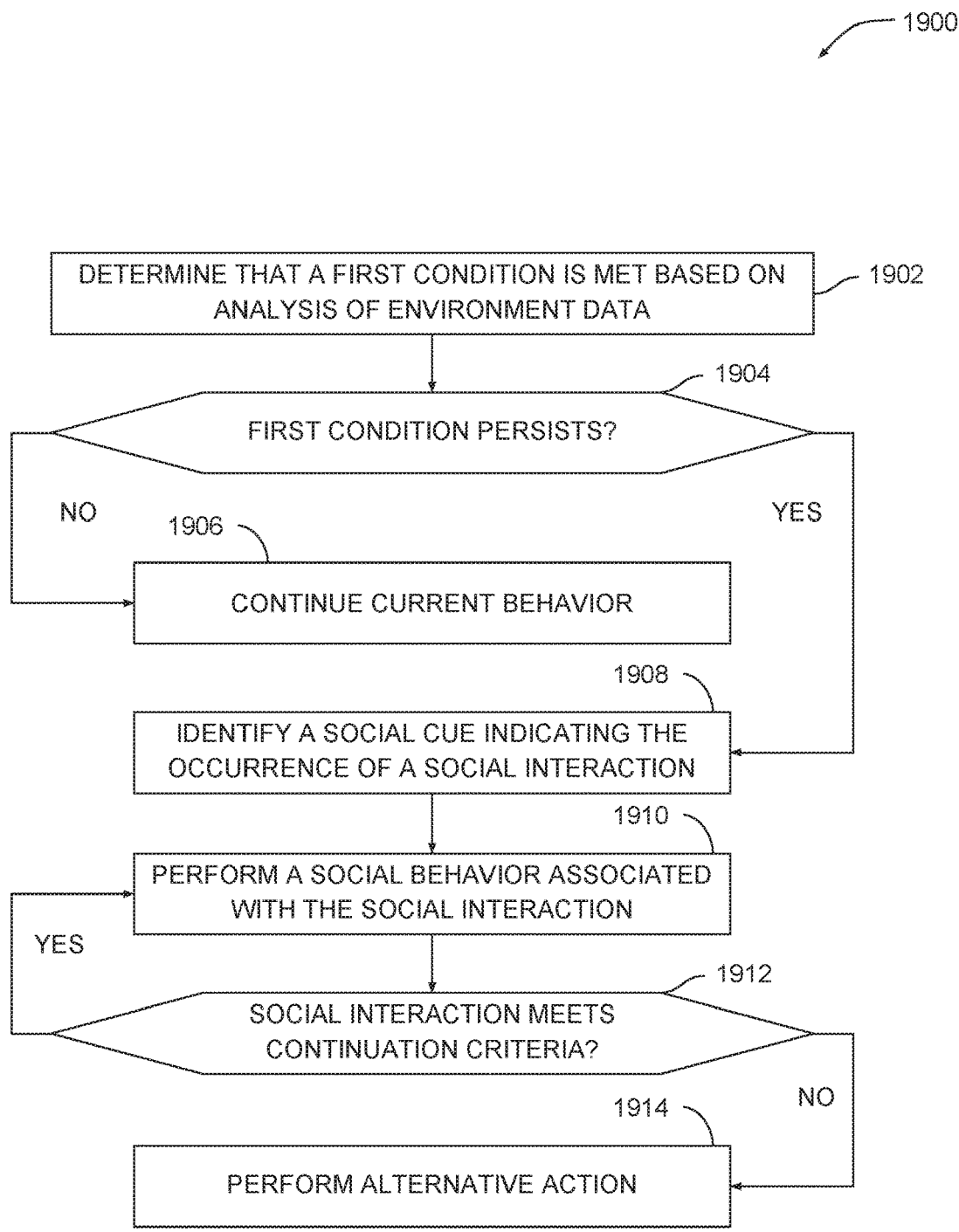
FIG. 19 is a flow diagram of method steps for causing a robot to engage in a social interaction, according to various embodiments.

As mentioned, social subsystem 264 can be preprogrammed to address a wide variety of expected social situations and engage in those situations via in-character behaviors. In addition, social subsystem 264 can transition between different social situations seamlessly by virtue of including numerous sequencers 1600 configured to interoperate with one another. FIG. 19 sets forth a general approach to managing social situations.

FIG. 19 is a flow diagram of method steps for causing a robot to engage in social interactions, according to various embodiments. Although the method steps are described in conjunction with the systems of FIGS. 1-4 and 16-18, persons skilled in the art will understand that any system may be configured to perform the method steps in any order.

As shown, a method 1900 begins at step 1902, where social subsystem 264 within robot 110 determines that a first condition is met based on analysis of environment data. For example, as described above in conjunction with FIGS. 17A-17B, social subsystem 264 could determine that a guest 150 presently resides directly in front of robot 110. Social subsystem 264 may implement a cue evaluator 1610 to identify whether conditions associated with specific cues are met. At step 1904, social subsystem 264 determines whether the first condition persists.

If the first condition does not persist, then social subsystem 264 allows robot 110 to continue a current behavior. However, if the first condition persists or repeats, then the method 1900 proceeds to step 1908. For example, referring to the example discussed in conjunction with FIGS. 17A-17B, social subsystem 264 could determine that the guest 150 continues to occupy a position directly in front of robot 110. In one embodiment, social subsystem 264 performs step 1904 after implementing one or more behaviors to mitigate the first condition.

At step 1908, social subsystem 264 identifies a social cue associated with the first condition indicating the occurrence of a social interaction. Social subsystem 264 could, for example, implement one or more cue evaluators 1610 to determine that the persistence of the first condition suggests that one or more guests 150 wish to engage robot 110 in a particular social interaction. At step 1910, social subsystem 264 causes robot 110 to perform a social behavior associated with the social interaction. For example, as discussed above in conjunction with FIGS. 17A-17B, social subsystem 264 could cause robot 110 to perform an in-character dance maneuver upon determining that the guest 150 wishes to engage socially.

At step 1912, social subsystem 264 determines whether the social interaction meets a set of continuation criteria. Conceptually, a given continuation criterion indicates whether robot 110 should continue performing the social interaction via the same set of behavior sequences 1620 or transition to a different set of behavior sequences. For example, in the example of FIGS. 17A-17B, social subsystem 264 evaluates whether the obstructing guest 150 has departed before deciding whether to persist in attempting to circumnavigate the guest 150 or transitioning to "happy mood." The continuation criteria may be defined separately for each social interaction in which social subsystem 264 is configured to participate may be evaluated via the associated cue evaluator 1610.

If, at step 1912, social subsystem 264 determines that the social interaction meets the continuation criteria, then the method 1900 returns to step 1910 where social subsystem 264 performs another social behavior associated with the social interaction. In one embodiment, social subsystem 264 continues to perform behaviors included in a given behavior sequence 1620 until all behaviors are exhausted.

If, at step 1912, social subsystem 264 determines that the social interaction does not meet the continuation criteria, then the method 1900 proceeds to step 1914 where social subsystem 264 initiates an alternative action. In doing so, social subsystem 264 may implement a different sequencer 1600 in order to change social interaction tactics, or social subsystem 264 may return control over robot 110 to a different subsystem altogether. For example, social subsystem 264 could determine that the social interaction is complete and then return to navigating towards a given destination.

The method 1900 is performed by any of the one or more sequencers 1600 included in social subsystem 264 in order to respond in a socially accurate manner to many different social situations. Each of these sequencers may be programmed to detect a different set of conditions, associated cues, and continuation criteria. In addition, any given sequencer 1600 may implement the method 1900 in order to transition control over robot 110 to a different sequencer 1600 in order to, for example, adjust the current social interaction strategy.

Referring generally to FIGS. 1-19, although these Figures are discussed in conjunction with the robot 110 described in detail in conjunction with FIGS. 1-4, persons skilled in the art will understand that any system configured to perform the operations of robot 110 falls within the scope of the present embodiments. Robot 110 and any components included therein may be implemented via one or more instances of a generic computing device described below in conjunction with FIG. 20.

Figure 20:
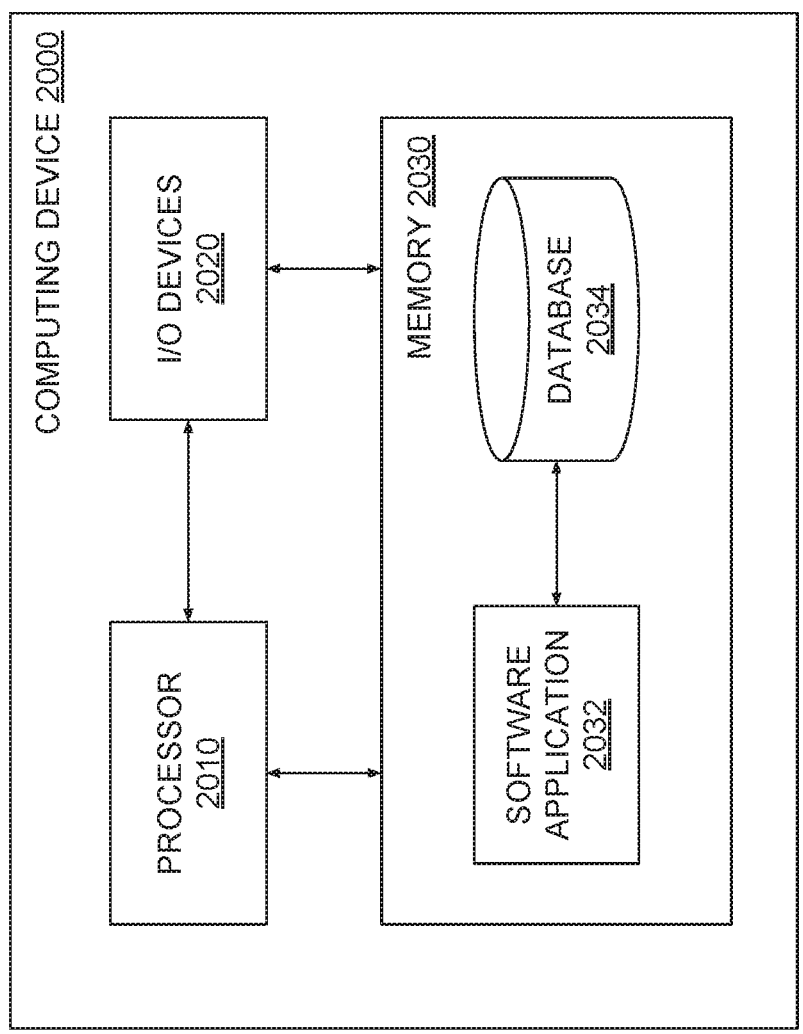
FIG. 20 is a block diagram of a computing device that may be included in the autonomous robot of FIG. 1, according to various embodiments.

FIG. 20 is a block diagram of a computing device that may be included in the autonomous robot of FIG. 1, according to various embodiments. As shown, computing device 2000 includes a processor 2010, input/output (I/O) devices 2020, and memory 2030. Memory 2030 includes a software application 2032 and a database 2034. Processor 2010 may include any hardware configured to process data and execute software applications. I/O devices 2020 include devices configured to receive input, devices configured to provide output, and devices configured to both receive input and provide output. Memory 2030 may be implemented by any technically feasible storage medium. Software application 2032 includes program code that, when executed by processor 2010, performs any of the operation and/or functionality described herein. Software application 2032 may access data stored in database 2034. Those skilled in the art will understand that computing device 2000 is provided for exemplary purposes only and not meant to limit the scope of the present embodiments.

Various embodiments are directed towards techniques that cause a robot to mitigate safety risks while performing a first set of operations. Those techniques include, without limitation, causing the robot to execute a first operation that is included in the first set of operations, determining that a safety risk exists based on analyzed sensor data, determining a first time interval within which the safety risk needs to be mitigated, wherein a safety subsystem executes a second operation that is not included in the first set of operations if the safety risk is not mitigated within the first time interval, and causing the robot to execute a third operation that is included in the first set of operations to mitigate the safety risk, wherein the safety subsystem cancels the second operation if the safety risk is mitigated within the first time interval.

Various other embodiments are directed towards techniques that cause a robot to negotiate social interactions while performing a series of operations associated with a performance. Those techniques include, without limitation, causing the robot to execute a first operation that is included in the series of operations, identifying, based on analyzed sensor data, a first social cue that indicates the occurrence of a first social interaction, causing the robot to execute a second operation that is included in the series operations and corresponds to the first social interaction, determining that the first social interaction is persisting, and causing the robot to execute a third operation that is not included in the series of operations to avoid the first social interaction.

In sum, an interactive autonomous robot is configured for deployment within a social environment. The disclosed robot includes a show subsystem configured to select between different in-character behaviors depending on robot status, thereby allowing the robot to appear in-character despite technical failures. The disclosed robot further includes a safety subsystem configured to intervene with in-character behavior when necessary to enforce safety protocols. The disclosed robot is also configured with a social subsystem that interprets social behaviors of humans and then initiates specific behavior sequences in response.

At least one advantage of the disclosed techniques is that the robot may appear to behave in character even when one or more robot subsystems fail. Accordingly, character-to-guest interactions need not be disrupted during partial robot failure. Another advantage is that the robot is configured to respond to numerous safety conditions without breaking character, and yet retains the capacity to break character if absolutely necessary. Yet another advantage is that the robot can identify and respond to numerous potentially challenging social situations while remaining in character, further enhancing how well the robot can portray a given character. Because the robot disclosed herein addresses several specific technical challenges, the disclosed techniques provide multiple technological advancements over the prior art.

1. Some embodiments include a computer-implemented method that causes a robot to enact a performance, the method comprising determining an initial set of operations associated with the performance, wherein each operation included in the initial set of operations is derived from a different behavior associated with a first character, determining a status for each subsystem included in a plurality of subsystems included in the robot, based on one or more of the statuses, modifying the initial set of operations to generate a set of available operations for enacting the performance, determining a first operation included in the set of available operations that should be executed by the robot, and causing the robot to execute the first operation.

2. The computer-implemented method of clause 1, wherein at least one status indicates a failure of at least one subsystem included in the plurality of subsystems.

3. The computer-implemented method of any of clauses 1-2, wherein modifying the initial set of operations comprises suppressing at least one operation included in the initial set of operations.

4. The computer-implemented method of any of clauses 1-3, wherein modifying the initial set of operations comprises determining, based on the one or more statuses, that a first subsystem included in the plurality of subsystems has failed, determining, based on a first set of dependencies, that a first operation included in the initial set of operations depends on the first subsystem, and removing the first operation from the initial set of operations to generate the set of available operations.

5. The computer-implemented method of any of clauses 1-4, wherein determining the first operation included in the set of available operations that should be executed by the robot comprises determining that a priority metric associated with the first operation exceeds any priority metric associated with any other operation included in the set of available operations.

6. The computer-implemented method of any of clauses 1-5, further comprising updating the one or more statuses in response to failure of a first subsystem included in the plurality of subsystems to generate a set of updated statuses, updating the set of available operations based on the set of updated statuses to generate an updated set of available operations, determining that the set of updated available operations does not include any available operations, and executing an emergency protocol to cause the robot to stop enacting the performance, wherein the emergency protocol is not derived from any behavior associated with the first character.

7. The computer-implemented method of any of clauses 1-6, further comprising identifying a first interactive element with which the robot is configured to interact, establishing communications with the first interactive element, determining a set of interactions between the robot and the first interactive element based on the communications with the first interactive element, and executing a first interaction included in the set of interactions with the first interactive element, wherein the first interaction includes at least one operation included in the set of available operations.

8. The computer-implemented method of any of clauses 1-7, wherein identifying the first interactive element comprises receiving a handshake signal from the first interactive element that is transmitted when the first interactive element detects the robot.

9. Some embodiments include a robot system configured to enact a performance, including a memory storing at least one software module, and a processor that, upon executing the at least one software module, is configured to perform the steps of determining an initial set of operations associated with the performance, wherein each operation included in the initial set of operations is derived from a different behavior associated with a first character, determining a status for each subsystem included in a plurality of subsystems included in the robot, based on one or more of the statuses, modifying the initial set of operations to generate a set of available operations for enacting the performance, determining a first operation included in the set of available operations that should be executed by the robot, and causing the robot to execute the first operation.

10. The robot system of clause 9, wherein the processor is further configured to perform the steps of identifying a first interactive element with which the robot is configured to interact, establishing communications with the first interactive element, determining a set of interactions between the robot and the first interactive element based on the communications with the first interactive element, and executing a first interaction included in the set of interactions with the first interactive element, wherein the first interaction includes at least one operation included in the set of available operations.

11. The robot system of any of clauses 9-10, wherein the step of identifying the first interactive element comprises receiving a handshake signal from the first interactive element that is transmitted in response to a navigation signal transmitted by the robot system.

12. The robot system of any of clauses 9-11, wherein the step of establishing communication with the first interactive element comprises transmitting an acknowledgement signal to the first interactive element in response to a handshake signal received from the first interactive element.

13. The robot system of any of clauses 9-12, wherein the step of determining the set of interactions comprises identifying at least one operation included in the set of available operations for which the first interactive element can perform at least one complimentary operation.

14. The robot system of any of clauses 9-13, wherein the at least one operation is identified based on an amount of available resources associated with the robot system or the first interactive element.

15. The robot system of any of clauses 9-14, wherein the step of executing the first interaction with the first interactive element comprises performing at least one operation included in the set of available operations that causes the first interactive element to perform a responsive corresponding operation.

16. The robot system of any of clauses 9-15, wherein the step of executing the first interaction with the first interactive element comprises generating a first target that indicates a first location to where the robot should navigate prior to executing the first interaction, generating a second target that indicates a second location to where the robot should direct a head portion of the robot when executing the first interaction, generating a set of interaction methods associated with executing the first interaction, and performing at least one operation associated with a first interaction method included in the set of interaction methods.

17. The robot system of any of clauses 9-16, further comprising terminating execution of the first interaction upon determining that a priority level associated with a second interaction included in the set of interactions exceeds a priority level associated with the first interaction, 18. Some embodiments include a non-transitory computer-readable medium that, when executed by a processor, causes a robot to enact a performance by performing the steps of determining an initial set of operations associated with the performance, wherein each operation included in the initial set of operations is derived from a different behavior associated with a first character, determining a status for each subsystem included in a plurality of subsystems included in the robot, based on one or more of the statuses, modifying the initial set of operations to generate a set of available operations for enacting the performance, determining a first operation included in the set of available operations that should be executed by the robot, and causing the robot to execute the first operation.

19. The non-transitory computer-readable medium of clause 18, wherein modifying the initial set of operations comprises determining, based on the one or more statuses, that a first subsystem included in the plurality of subsystems has failed, determining, based on a first set of dependencies, that a first operation included in the initial set of operations depends on the first subsystem, and removing the first operation from the initial set of operations to generate the set of available operations.

20. The non-transitory computer-readable medium of any of clauses 18-19, further comprising the steps of establishing communications with the first interactive element, determining a set of interactions between the robot and the first interactive element based on the communications with the first interactive element, and executing a first interaction included in the set of interactions with the first interactive element, wherein the first interaction includes at least one operation included in the set of available operations.

Any and all combinations of any of the claim elements recited in any of he claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method that causes a robot to enact a performance, the method comprising:
   determining an initial set of operations that the robot should execute to enact a first performance, wherein each operation included in the initial set of operations is derived from a different in-character behavior associated with a first character;
   determining a first degree to which a first subsystem included in a plurality of subsystems included in the robot is available when the robot enacts the first performance;
   determining, based on the first degree and a dependency between the first subsystem and at least one operation that is included in the initial set of operations and that is associated with a first movement or in-character behavior associated with the first character, a metric indicating a second degree to which the robot can perform the at least one operation;
   determining that the metric meets a threshold criterion;
   in response to the metric meeting the threshold criterion, removing the at least one operation from the initial set of operations to generate a remaining set of available operations for enacting the first performance, wherein the remaining set of available operations maintains a plurality of in-character behaviors such that the robot appears in-character while enacting the first performance even after the at least one operation has been removed;
   determining a first operation included in the remaining set of available operations that the robot should execute; and
   causing the robot to execute the first operation.

2. The computer-implemented method of claim 1, wherein the first degree indicates a failure of at least one subsystem included in the plurality of subsystems.

3. The computer-implemented method of claim 1, wherein removing the at least one operation from the initial set of operations comprises suppressing at least one operation included in the initial set of operations.

4. The computer-implemented method of claim 1, wherein removing the at least one operation from the initial set of operations comprises:
   determining, based on at least one of the first degree or the metric, that a first subsystem included in the plurality of subsystems has failed;
   determining, based on a first set of dependencies, that a first operation included in the initial set of operations depends on the first subsystem; and
   removing the first operation from the initial set of operations to generate the remaining set of available operations.

5. The computer-implemented method of claim 1, wherein determining the first operation included in the remaining set of available operations that the robot should execute comprises determining that a priority metric associated with the first operation exceeds any priority metric associated with any other operation included in the remaining set of available operations.

6. The computer-implemented method of claim 1, further comprising:
   generating one or more statuses in response to failure of the first subsystem included in the plurality of subsystems to generate a set of updated statuses;
   updating the remaining set of available operations based on the set of updated statuses to generate an updated set of available operations;
   determining that the updated set of available operations does not include any available operations; and
   executing an emergency protocol to cause the robot to stop enacting the first performance, wherein the emergency protocol is not derived from any behavior associated with the first character.

7. The computer-implemented method of claim 1, further comprising:
   identifying a first interactive element with which the robot is configured to interact;
   establishing communications with the first interactive element;
   determining a set of interactions between the robot and the first interactive element based on the communications with the first interactive element; and
   executing a first interaction included in the set of interactions with the first interactive element, wherein the first interaction includes at least one operation included in the remaining set of available operations.

8. The computer-implemented method of claim 7, wherein identifying the first interactive element comprises receiving a handshake signal from the first interactive element that is transmitted when the first interactive element detects the robot.

9. A robot system configured to enact a performance, including:
- one or more memories storing at least one software module; and
- one or more processors that, upon executing the at least one software module,
  - are configured to perform the steps of:
    - determining an initial set of operations that the robot should execute to enact a first performance, wherein each operation included in the initial set of operations is derived from a different in-character behavior associated with a first character,
    - determining a first degree to which a first subsystem included in a plurality of subsystems included in the robot is available when the robot enacts the first performance,
    - determining, based on the first degree and a dependency between the first subsystem and at least one operation that is included in the initial set of operations and that is associated with a first movement or in-character behavior associated with the first character, a metric indicating a second degree to which the robot can perform the at least one operation,
    - determining that the metric meets a threshold criterion,
    - in response to the metric meeting the threshold criterion, removing the at least one operation from the initial set of operations to generate a remaining set of available operations for enacting the first performance, wherein the remaining set of available operations maintains a plurality of in-character behaviors such that the robot appears in-character while enacting the first performance even after the at least one operation has been removed,
    - determining a first operation included in the remaining set of available operations that the robot should execute, and
    - causing the robot to execute the first operation.

10. The robot system of claim 9, wherein the one or more processors are further configured to perform the steps of:
- identifying a first interactive element with which the robot is configured to interact;
- establishing communications with the first interactive element;
- determining a set of interactions between the robot and the first interactive element based on the communications with the first interactive element; and
- executing a first interaction included in the set of interactions with the first interactive element, wherein the first interaction includes at least one operation included in the remaining set of available operations.

11. The robot system of claim 10, wherein the step of identifying the first interactive element comprises receiving a handshake signal from the first interactive element that is transmitted in response to a navigation signal transmitted by the robot system.

12. The robot system of claim 10, wherein the step of establishing communication with the first interactive element comprises transmitting an acknowledgement signal to the first interactive element in response to a handshake signal received from the first interactive element.

13. The robot system of claim 10, wherein the step of determining the set of interactions comprises identifying at least one operation included in the remaining set of available operations for which the first interactive element can perform at least one complementary operation.

14. The robot system of claim 13, wherein the at least one operation is identified based on an amount of available resources associated with the robot system or the first interactive element.

15. The robot system of claim 10, wherein the step of executing the first interaction with the first interactive element comprises performing at least one operation included in the remaining set of available operations that causes the first interactive element to perform a responsive corresponding operation.

16. The robot system of claim 10, wherein the step of executing the first interaction with the first interactive element comprises:
- generating a first target that indicates a first location to where the robot should navigate prior to executing the first interaction;
- generating a second target that indicates a second location to where the robot should direct a head portion of the robot when executing the first interaction;
- generating a set of interaction methods associated with executing the first interaction; and
- performing at least one operation associated with a first interaction method included in the set of interaction methods.

17. The robot system of claim 10, further comprising terminating execution of the first interaction upon determining that a priority level associated with a second interaction included in the set of interactions exceeds a priority level associated with the first interaction.

18. One or more non-transitory computer-readable media that, when executed by one or more processors, causes a robot to enact a performance by performing the steps of:
- determining an initial set of operations that the robot should execute to enact a first performance, wherein each operation included in the initial set of operations is derived from a different in-character behavior associated with a first character;
- determining a first degree to which a first subsystem included in a plurality of subsystems included in the robot is available when the robot enacts the first performance;
- determining, based on the first degree and a dependency between the first subsystem and at least one operation that is included in the initial set of operations and that is associated with a first movement or in-character behavior associated with the first character, a metric indicating a second degree to which the robot can perform the at least one operation;
- determining that the metric meets a threshold criterion;
- in response to the metric meeting the threshold criterion, removing at least one operation from the initial set of operations to generate a remaining set of available operations for enacting the first performance, wherein the remaining set of available operations maintains a plurality of in-character behaviors such that the robot appears in-character while enacting the first performance even after the at least one operation has been removed;
- determining a first operation included in the remaining set of available operations that the robot should execute; and
- causing the robot to execute the first operation.

19. The one or more non-transitory computer-readable media of claim 18, wherein removing the at least one operation from the initial set of operations comprises:

determining, based on at least one of the first degree or the metric, that a first subsystem included in the plurality of subsystems has failed;

determining, based on a first set of dependencies, that a first operation included in the initial set of operations depends on the first subsystem; and removing the first operation from the initial set of operations to generate the remaining set of available operations.

20. The one or more non-transitory computer-readable media of claim 18, further comprising the steps of:

establishing communications with a first interactive element;

determining a set of interactions between the robot and the first interactive element based on the communications with the first interactive element; and executing a first interaction included in the set of interactions with the first interactive element, wherein the first interaction includes at least one operation included in the remaining set of available operations.

* * * * *